(12) United States Patent
Ayala et al.

(10) Patent No.: US 12,546,094 B2
(45) Date of Patent: Feb. 10, 2026

(54) BATHROOM SYSTEM

(71) Applicant: Kohler Co., Kohler, WI (US)

(72) Inventors: Diego Alejandro Cuervo Ayala, Sheboygan, WI (US); Connor McManus, Sheboygan, WI (US); Colin Clarke, Hempshire (GB)

(73) Assignee: Kohler Co., Kohler, WI (US)

( * ) Notice: Subject to any disclaimer, the term of this patent is extended or adjusted under 35 U.S.C. 154(b) by 220 days.

(21) Appl. No.: 18/328,100

(22) Filed: Jun. 2, 2023

(65) Prior Publication Data

US 2023/0407608 A1  Dec. 21, 2023

Related U.S. Application Data

(60) Provisional application No. 63/353,781, filed on Jun. 20, 2022.

(51) Int. Cl.
*E03B 1/04* (2006.01)
*E03D 5/00* (2006.01)

(52) U.S. Cl.
CPC .............. *E03B 1/042* (2013.01); *E03D 5/003* (2013.01); *E03B 2001/045* (2013.01)

(58) Field of Classification Search
CPC ... E03D 5/003; E03B 2001/045; E03B 1/041; E03B 1/042
See application file for complete search history.

(56) References Cited

U.S. PATENT DOCUMENTS

| | | | |
|---|---|---|---|
| 3,112,497 A | 12/1963 | Call | |
| 3,318,449 A | 5/1967 | Jennings et al. | |
| 3,995,327 A | 12/1976 | Henderick | |
| 4,030,144 A | 6/1977 | Aleman | |
| 4,069,521 A | 1/1978 | Aleman | |
| 4,070,714 A | 1/1978 | Bishton et al. | |
| 4,115,879 A | 9/1978 | Toms | |
| 4,162,218 A | 7/1979 | McCormick | |
| 4,358,864 A | 11/1982 | Medrano | |
| 4,377,875 A | 3/1983 | Brubakken | |
| 4,675,923 A * | 6/1987 | Ashley .................. | E04H 1/1277 4/596 |

(Continued)

FOREIGN PATENT DOCUMENTS

| WO | WO-97/02387 | 1/1997 |
|---|---|---|
| WO | WO-97/28320 | 8/1997 |

(Continued)

*Primary Examiner* — Janie M Loeppke
(74) *Attorney, Agent, or Firm* — Foley & Lardner LLP

(57) ABSTRACT

A bathroom system includes a shower system, a sink system, a gray water tank, a toilet, a first conduit, and a second conduit. The shower system includes a drain ring configured to collect gray water from the shower system. The gray water tank includes an internal filtration system and is configured to filter and store gray water. The gray water tank is configured to introduce a chemical into the gray water and is configured to draw electrical power from a power supply. The first conduit is coupled to the gray water, it connects the shower system and the gray water tank, and it is configured to transfer the gray water from the drain ring to the gray water tank. The second conduit is configured to transfer the gray water from the gray water tank to the toilet to provide water for flushing.

17 Claims, 10 Drawing Sheets

(56) References Cited

U.S. PATENT DOCUMENTS

| | | | |
|---|---|---|---|
| 5,106,493 A | 4/1992 | McIntosh | |
| 5,201,082 A | 4/1993 | Rockwell | |
| 5,232,010 A | 8/1993 | Rozenblatt et al. | |
| 5,317,766 A | 6/1994 | McDonald et al. | |
| 5,345,625 A | 9/1994 | Diemand | |
| 5,406,657 A | 4/1995 | Donati | |
| 5,425,146 A | 6/1995 | Serrano | |
| 5,452,956 A | 9/1995 | Gilliam | |
| 5,498,330 A | 3/1996 | Delle Cave | |
| 5,557,812 A | 9/1996 | Sayant | |
| 5,573,677 A | 11/1996 | Dembrosky | |
| 5,711,038 A | 1/1998 | Niethammer et al. | |
| 5,813,047 A | 9/1998 | Teichroeb | |
| 5,845,346 A | 12/1998 | Johnson, Jr. | |
| 6,314,590 B1 * | 11/2001 | Lee | E03D 5/003 |
| | | | 4/597 |
| 6,355,160 B1 | 3/2002 | Wiseman et al. | |
| 6,408,460 B1 | 6/2002 | Naoum | |
| 6,702,942 B1 | 3/2004 | Nield | |
| 6,802,090 B2 | 10/2004 | Martin | |
| 6,804,843 B1 | 10/2004 | Hung | |
| 6,889,395 B1 | 5/2005 | Hodges | |
| 7,118,677 B2 | 10/2006 | Hoffjann et al. | |
| 7,870,868 B1 | 1/2011 | Iialaole | |
| 7,913,331 B2 | 3/2011 | Hartman | |
| 7,927,481 B2 | 4/2011 | Martinello | |
| 7,947,164 B2 | 5/2011 | Hoffjann et al. | |
| 8,133,385 B2 | 3/2012 | Premathilake et al. | |
| 8,191,307 B2 | 6/2012 | Donoghue et al. | |
| 8,239,982 B2 | 8/2012 | Fryan | |
| 8,375,481 B1 | 2/2013 | Gibbins | |
| 8,607,377 B2 * | 12/2013 | Borg | E03B 1/041 |
| | | | 4/665 |
| 8,623,200 B2 | 1/2014 | Williamson | |
| 8,696,897 B2 | 4/2014 | Marugame | |
| 8,834,716 B2 | 9/2014 | Parkinson et al. | |
| 8,920,657 B2 | 12/2014 | Kawasaki | |
| 8,931,122 B1 | 1/2015 | Cerce | |
| 9,096,996 B2 | 8/2015 | Garza Laguera Garza | |
| 9,493,937 B2 | 11/2016 | Derenoncourt | |
| 9,517,946 B2 | 12/2016 | Lin-Hendel | |
| 9,540,107 B2 | 1/2017 | Boodaghians et al. | |
| 9,758,955 B1 | 9/2017 | Lee | |
| 9,879,406 B2 | 1/2018 | De Garay Arellano | |
| 9,879,410 B2 | 1/2018 | Yeh | |
| 9,970,184 B2 * | 5/2018 | Green | E03C 1/264 |
| 10,132,083 B1 | 11/2018 | Casey | |
| 10,214,289 B2 | 2/2019 | Boodaghians et al. | |
| 10,214,880 B2 * | 2/2019 | Robb | E03D 5/003 |
| 10,329,743 B2 | 6/2019 | Mimone | |
| 10,655,313 B2 * | 5/2020 | Garrels | E03D 5/003 |
| 10,676,903 B2 | 6/2020 | Van Der Jagt et al. | |
| 10,774,509 B2 | 9/2020 | Green | |
| 10,843,938 B2 | 11/2020 | Mahdjoubi Namin | |
| 10,968,114 B2 | 4/2021 | Vielma | |
| 11,168,471 B2 | 11/2021 | Garrels et al. | |
| 11,180,379 B2 | 11/2021 | Valkieser | |
| 11,230,828 B2 | 1/2022 | Baer et al. | |
| 11,560,695 B1 | 1/2023 | Sadeghini | |
| 2004/0040908 A1 | 3/2004 | Orava et al. | |
| 2004/0168992 A1 | 9/2004 | Ben-Amotz | |
| 2006/0144769 A1 | 7/2006 | Okros | |
| 2007/0174959 A1 | 8/2007 | Sanders et al. | |
| 2010/0125938 A1 * | 5/2010 | Billon | E03D 5/006 |
| | | | 4/317 |
| 2010/0126233 A1 | 5/2010 | Oekroes | |
| 2010/0212758 A1 * | 8/2010 | Postacchini | E03D 5/003 |
| | | | 137/565.16 |
| 2011/0067769 A1 | 3/2011 | Stimpson | |
| 2011/0167551 A1 | 7/2011 | Garza Laguera Garza | |
| 2012/0047644 A1 | 3/2012 | Larson | |
| 2012/0199220 A1 | 8/2012 | Knepp et al. | |
| 2013/0180928 A1 | 7/2013 | Vielma | |
| 2014/0230141 A1 | 8/2014 | Erdmann | |
| 2015/0185737 A1 * | 7/2015 | Yeh | G05D 9/02 |
| | | | 137/571 |
| 2015/0376883 A1 | 12/2015 | Garrels et al. | |
| 2016/0230376 A1 | 8/2016 | Toraman | |
| 2016/0340882 A1 | 11/2016 | Lee | |
| 2017/0107701 A1 | 4/2017 | Lin-Hendel | |
| 2017/0297939 A1 | 10/2017 | Tseng et al. | |
| 2019/0047878 A1 | 2/2019 | Thompson et al. | |
| 2020/0256045 A1 | 8/2020 | Trout | |
| 2021/0148095 A1 | 5/2021 | Thompson et al. | |
| 2021/0206657 A1 | 7/2021 | Vielma | |
| 2021/0380051 A1 | 12/2021 | Taylor et al. | |
| 2022/0025628 A1 | 1/2022 | Garrels et al. | |
| 2022/0145596 A1 | 5/2022 | Thompson et al. | |
| 2023/0075157 A1 | 3/2023 | Liu et al. | |

FOREIGN PATENT DOCUMENTS

| | | |
|---|---|---|
| WO | WO-99/07952 | 2/1999 |
| WO | WO-99/40265 | 8/1999 |
| WO | WO-00/75438 | 12/2000 |
| WO | WO-03/023154 | 3/2003 |
| WO | WO-2005/056935 | 6/2005 |
| WO | WO-2006/001577 | 1/2006 |
| WO | WO-2008/110057 | 9/2008 |
| WO | WO-2009/010607 | 1/2009 |
| WO | WO-2011/005883 | 1/2011 |
| WO | WO-2011/023076 | 3/2011 |
| WO | WO-2011/023077 | 3/2011 |
| WO | WO-2011/103657 | 9/2011 |
| WO | WO-2012/081009 | 6/2012 |
| WO | WO-2016/140417 | 9/2016 |
| WO | WO-2018/069844 | 4/2018 |
| WO | WO-2018/113978 | 6/2018 |
| WO | WO-2019/054525 | 3/2019 |
| WO | WO-2020/121320 | 6/2020 |
| WO | WO-2021/080490 | 4/2021 |
| WO | WO-2021/228918 | 11/2021 |

* cited by examiner

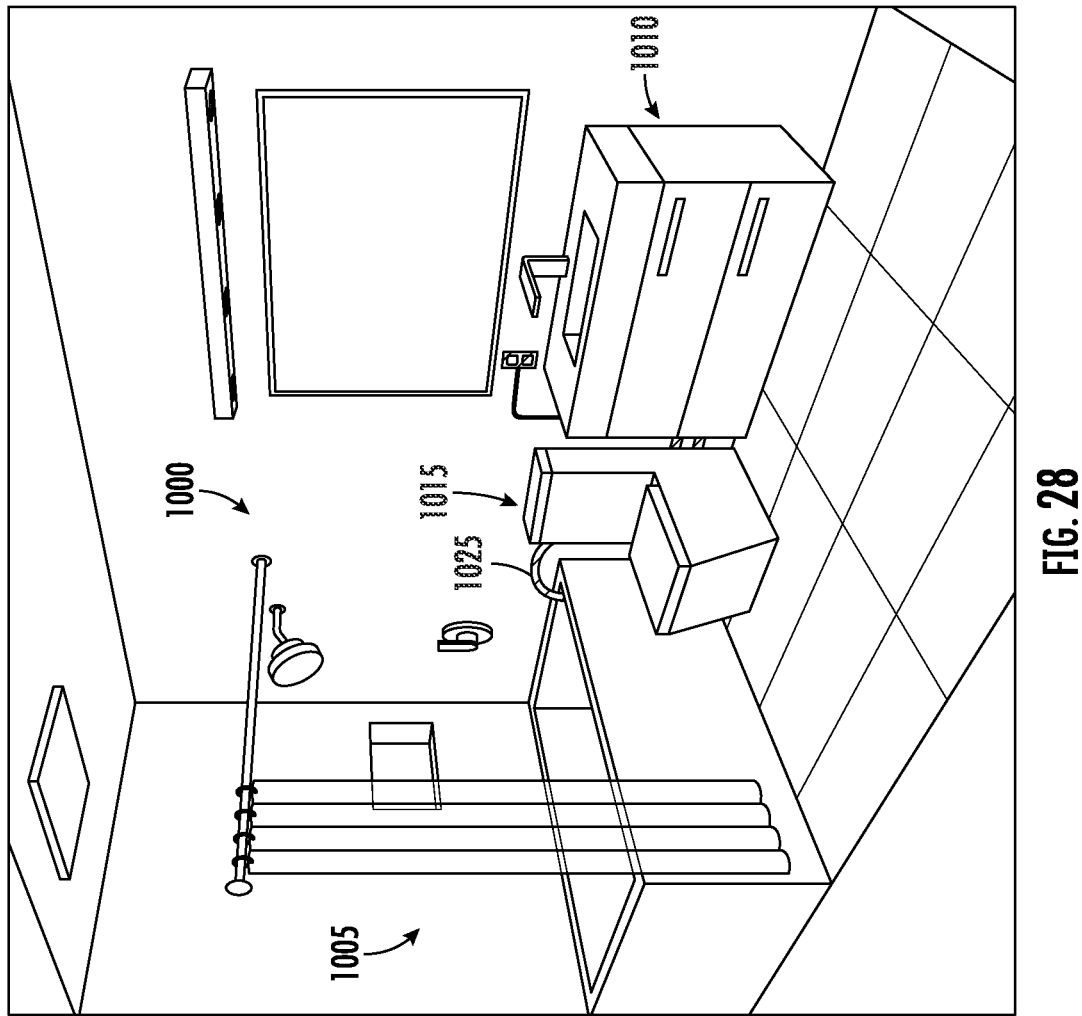
FIG. 28
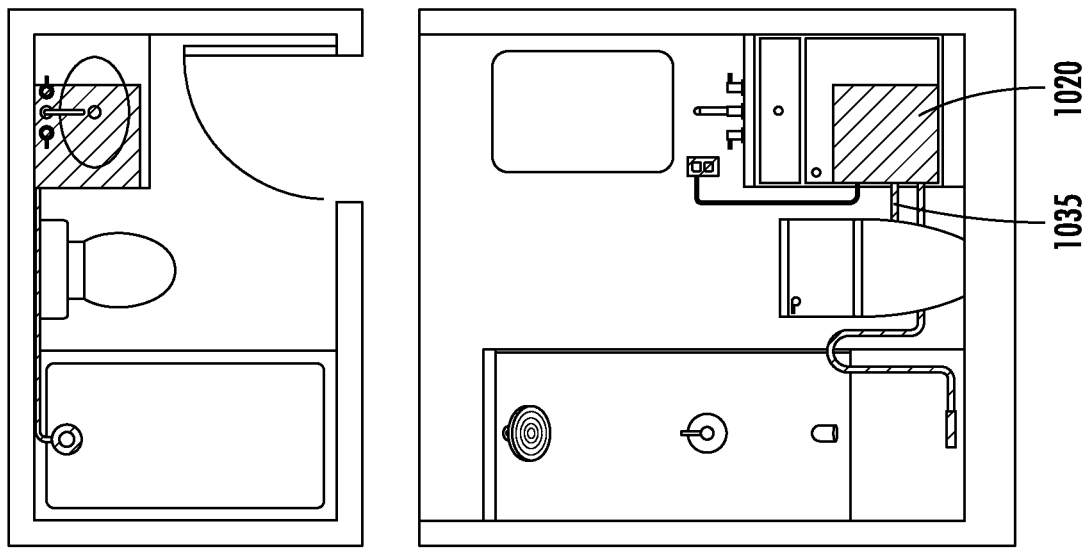
FIG. 29
FIG. 30

BATHROOM SYSTEM

CROSS-REFERENCE TO RELATED PATENT APPLICATIONS

This application claims the benefit of and priority to U.S. Provisional Patent Application No. 63/353,781, filed Jun. 20, 2022, the entire disclosure of which is incorporated by reference herein.

BACKGROUND

The present application relates generally to the field of bathroom systems. In particular, the present application relates to a system for reusing or recycling gray water.

In the context of the present application, the term "gray water" means untreated waste water that has previously been used in, for example, a shower, sink, washing machine, bathtub, or the like. Gray water is normally directed into plumbing systems by way of a drain, where the gray water is then transferred into a sewer system.

It would be advantageous to capture and recycle gray water in a bathroom environment.

SUMMARY

According to an exemplary embodiment, a bathroom system includes a mechanism for gathering gray water from a bathing or showering environment and directing such gray water to a storage tank where it can later be deployed, for example, to a toilet or urinal.

According to one particular embodiment, such a bathroom system includes a shower system, a sink system, and a toilet. The shower system includes a drain ring or a shower tray configured to collect gray water from the shower system. A first pipe or conduit transfers the gray water from the drain ring or the shower tray to a gray water tank. The gray water tank is one of a standalone gray water tank, hidden gray water tank, or a mountable gray water tank on and/or in a sidewall of the bathroom system. The gray water tank is configured to filter and store the gray water. The gray water may then be directed to a toilet or urinal to provide water for flushing.

This summary is illustrative only and should not be regarded as limiting.

BRIEF DESCRIPTION OF THE FIGURES

The disclosure will become more fully understood from the following detailed description, taken in conjunction with the accompanying figures, wherein like reference numerals refer to like elements, in which:

FIG. 28 is a perspective view of a bathroom system including a hidden gray water tank bathroom vanity, according to another exemplary embodiment;

FIG. 29 is a top view of the bathroom system of FIG. 28; and

FIG. 30 is a front view of the bathroom system of FIG. 28.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the FIGURES, a bathroom system includes at least one of a shower or bathing system, a sink system, and a toilet. The shower system outputs gray water that can be captured, stored, and recycled for use in the toilet. According to various exemplary embodiments, gray water from the shower system is captured via drain rings, shower trays, or the like, where the gray water is stored within a gray water tank. The gray water tank may include an internal filtration system that is configured to filter the gray water to remove any amount of unwanted material from the gray water. Upon flushing the toilet, the gray water is provided to the toilet for the flush.

Stand-Alone Gray Water Tank

Figure 1:
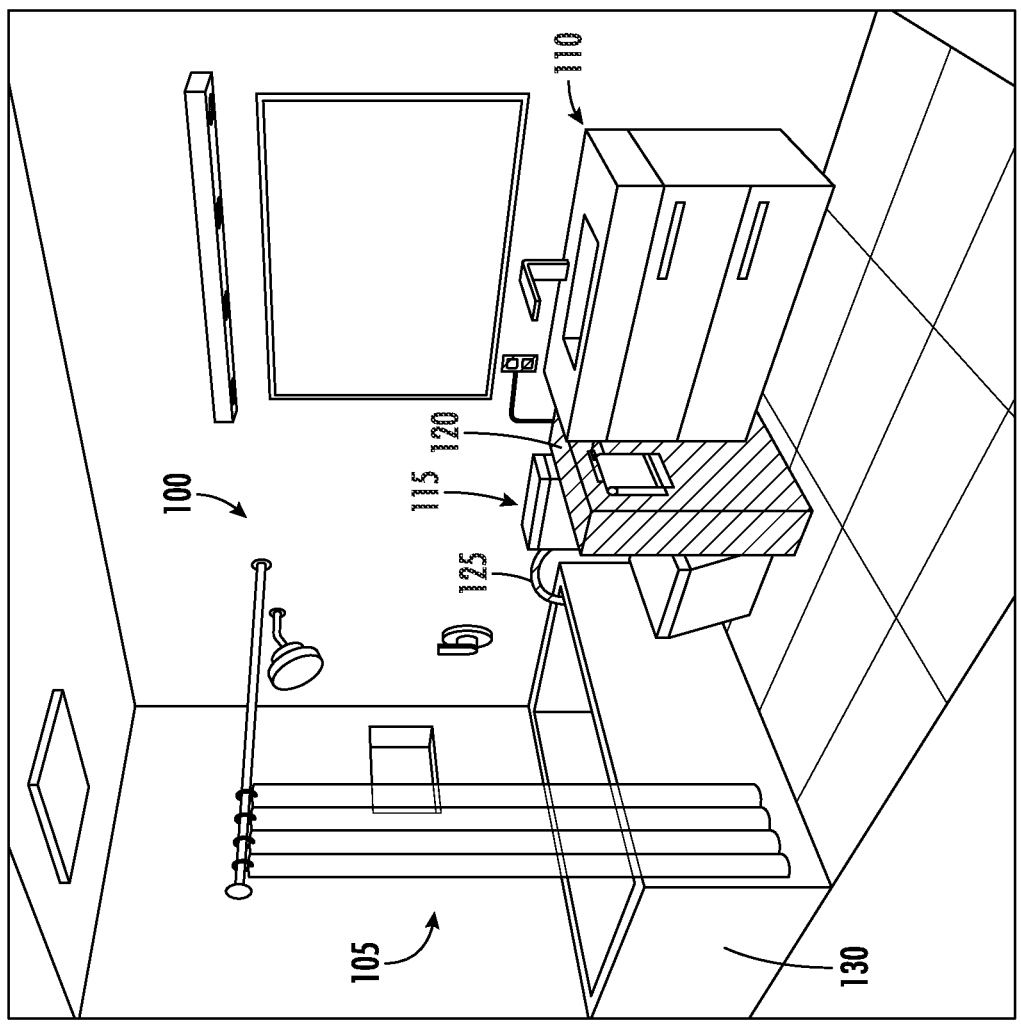
FIG. 1 is a perspective view of a bathroom system including a stand-alone gray water tank, according to an exemplary embodiment.
Figure 2:
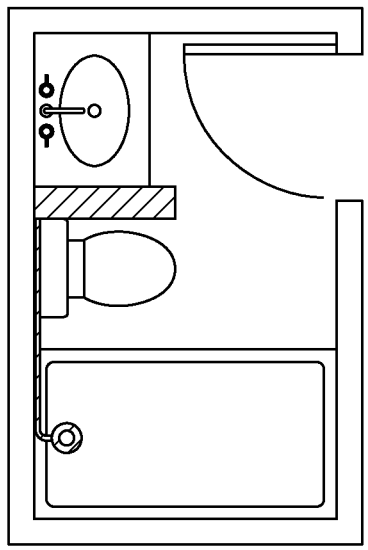
FIG. 2 is a top view of the bathroom system of FIG. 1.
Figure 3:
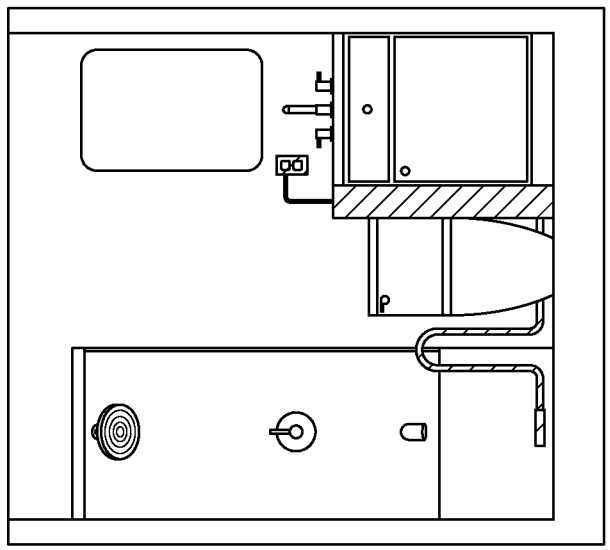
FIG. 3 is a front view of the bathroom system of FIG. 1.

Referring now to FIGS. 1-3, a bathroom system 100 is shown according to an exemplary embodiment. The bathroom system 100 includes a shower system 105, a sink system 110, and a toilet 115 positioned between the shower system 105 and the sink system 110. In other embodiments, the sink system 110 is positioned between the shower system 105 and the toilet 115 or elsewhere. The bathroom system 100 includes a tank 120 or container for storing and filtering gray water (hereinafter referred to for ease of reference as a "gray water tank") that, as shown, is positioned between the toilet 115 and the sink system 110 (although it should be understood that the gray water tank 120 may be provided in any suitable location).

The gray water tank 120 includes a first pipe 125 or conduit fluidly connecting the shower system 105 and the gray water tank 120 to deliver water from the bathtub 130 to the gray water tank 120. The first pipe 125 may be a water inlet, where gray water is delivered to the gray water tank 120 from the shower system 105. The first pipe 125 is configured to capture the gray water via a drain ring and deliver the gray water to the gray water tank 120. Additionally or alternatively, the first pipe 125 may be configured to capture fluid (e.g., clean water, etc.) via the drain ring and deliver the fluid to the gray water tank 120. The first pipe 125 may be an external pipe that is positioned along a sidewall of the bathroom. As shown in FIG. 1, the first pipe 125 extends over top of a sidewall of the shower system 105 and is further positioned rearward the toilet 115. The first pipe 125 is coupled to the gray water tank 120 proximate a bottom edge of the gray water tank 120. In other embodiments, the first pipe 125 is coupled to the gray water tank 120 distal the bottom edge of the gray water tank 120.

The gray water tank 120 may be configured to filter the gray water delivered to the gray water tank 120 from the first pipe 125. As can be appreciated, the gray water tank 120 may include an internal filtration system where the gray water passes through to remove material (e.g., human matter, solids, etc.) from the gray water. Additionally or alternatively, the gray water tank 120 may introduce a chemical into the gray water to clean the gray water.

The gray water tank 120 may include an electrical connection configured to draw power from an external power supply (e.g., outlet plug, etc.). The gray water tank 120 may draw electrical power from the power supply to actuate the internal filtration system. Additionally or alternatively, the gray water tank 120 may draw electrical power from the power supply to actuate one or more motors within the gray water tank 120, where the motors are configured to rotate components of the internal filtration system. Although electrical power is contemplated, alternate forms of power or modes of operation may be supplied to the gray water tank 120 (e.g., battery power, mechanical power, stationary filters for the gray water to pass through, etc.).

The gray water tank 120 may be configured hold the gray water delivered to the gray water tank 120 from the first pipe 125. The gray water tank 120 may include one or more tanks contained within, that are configured to capture and hold the gray water. The one or more tanks may be airtight enclosures that do not allow the gray water or air to exit the one or more tanks. Although not shown, the gray water tank 120 further includes a water outlet fluidly coupled to the gray water tank 120 and the toilet 115, where gray water is delivered to the toilet 115 from the gray water tank 120. As shown in FIG. 2, the gray water tank 120 abuts a reservoir (e.g., sump, etc.) of the toilet 115 so that the gray water is delivered directly to the toilet 115. In other embodiments, the gray water tank 120 may include a second pipe fluidly coupled to the gray water tank 120 and the toilet 115, where the second pipe is configured to deliver gray water to the toilet 115.

The gray water tank 120 may further include accessory features positioned externally the gray water tank 120. For example, the gray water tank 120 may include a towel rack that is configured to hold a towel thereon. In another example, the gray water tank 120 may include a toilet paper holder that is configured to hold a roll of toilet paper thereon.

In yet another example, the gray water tank 120 may include one or more storage compartments that are configured to store accessory components of the bathroom system 100 (e.g., bathroom towels, etc.) therein.

Once the one or more tanks are full, no more gray water can be stored therein. The excess gray water is discharged into a drain in the shower system 105, where the gray water is traditionally disposed of.

When the toilet 115 is flushed, the gray water is supplied to the toilet 115 to assist in the performance of the flush (e.g., to provide all or a portion of the flush water, to provide replacement water to a toilet tank, to provide water to the sump to provide a pressure assist for the flushing action, etc.). Additionally or alternatively, the gray water may be supplied directly to the bowl of the toilet 115 to assist in the performance of the flush. The toilet 115 may create pressure (e.g., back pressure, etc.) to pull the gray water into the toilet 115 from the one or more tanks. The one or more tanks may include a valve (e.g., one way valve, etc.) fluidly coupled between the one or more tanks and the toilet 115, where the valve opens and closes in response to the toilet 115 being flushed. For example, the pressure caused from flushing the toilet 115 may cause the valve to open and allow the gray water to flow into the toilet 115.

The gray water may be a secondary source of water for the flush. The toilet 115 further includes a primary water supply. The primary water supply may be a traditional water supply. The toilet 115 may use the gray water in situations where the one or more tanks includes any amount of gray water for a flush. The remaining water for the flush comes from the primary water supply. For example, the toilet 115 may use an existing amount gray water from the one or more tanks and the remaining amount of water is drawn from the primary water supply on each flush.

Although it is contemplated to reuse gray water from the shower system 105, the gray water from the sink system 110 may further be transferred to the one or more tanks to assist in flushing the toilet 115. In such an embodiment, the sink system 110 may include an additional pipe that is configured to transfer the gray water from the sink system 110 to the gray water tank 120.

Stand-Alone Gray Water Tank and Shower Tray

Figure 4:
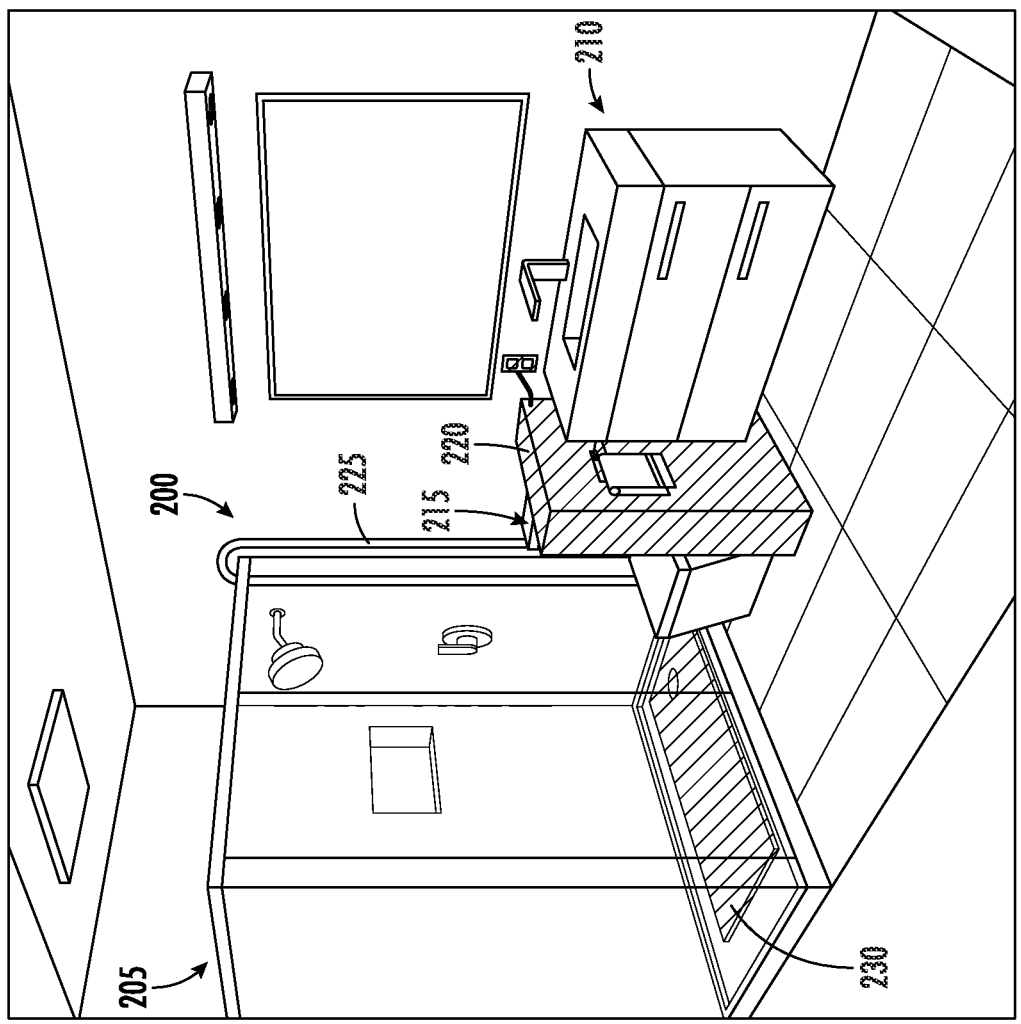
FIG. 4 is a perspective view of a bathroom system including a stand-alone gray water tank and a shower tray, according to another exemplary embodiment.
Figure 5:
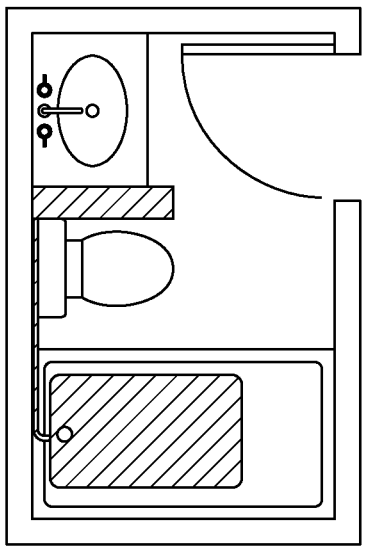
FIG. 5 is a top view of the bathroom system of FIG. 4.
Figure 6:
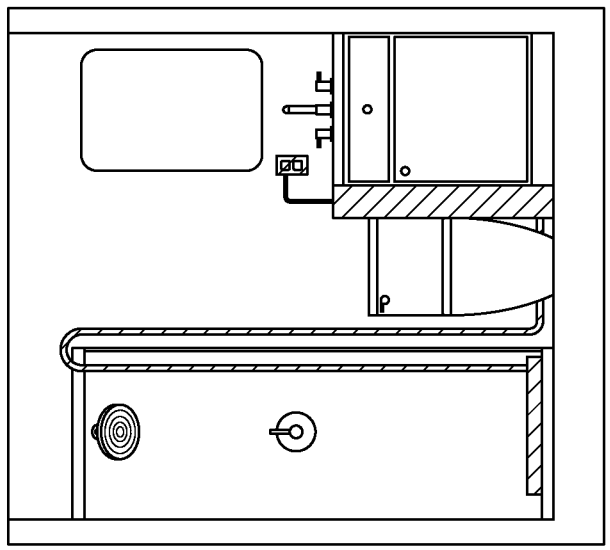
FIG. 6 is a front view of the bathroom system of FIG. 4.

Referring now to FIGS. 4-6, a bathroom system 200 is shown according to an exemplary embodiment. The bathroom system 200 includes a shower system 205, a sink system 210, and a toilet 215 positioned between the shower system 205 and the sink system 210. In other embodiments, the sink system 210 is positioned between the shower system 205 and the toilet 215. The bathroom system 200 includes a gray water tank 220. The gray water tank 220 may be positioned between the toilet 215 and the sink system 210 (although the gray water tank 220 may be provided in any suitable location). The gray water tank 220 may be one of a storage gray water tank, standalone gray water tank, filtration gray water tank, etc. The gray water tank 220 may be a prismatic gray water tank sized to tightly fit between the toilet 215 and the sink system 210. In other embodiments, the gray water tank 220 may take on a shape other than a prism.

The gray water tank 220 includes a first pipe 225 or conduit fluidly coupled to the shower system 205 and the gray water tank 220. The first pipe 225 may be a water inlet, where gray water is delivered to the gray water tank 220 from the shower system 205. The first pipe 225 is configured to capture the gray water via a shower tray 230 and deliver the gray water to the gray water tank 220. Additionally or alternatively, the first pipe 225 may be configured to capture fluid (e.g., clean water, etc.) via the shower tray 230 and deliver the fluid to the gray water tank 220. The first pipe 225 may be an external pipe that is positioned along a sidewall of the bathroom. As shown in FIG. 4, the first pipe 225 extends over top of a sidewall of the shower system 205 and is further positioned rearward the toilet 215. The first pipe 225 is coupled to the gray water tank 220 proximate a bottom edge of the gray water tank 220. In other embodiments, the first pipe 225 is coupled to the gray water tank 220 distal the bottom edge of the gray water tank 220.

The shower tray 230 may be a tray positioned within the shower system 205 where the shower tray 230 is provided along a portion of a shower receptor. In other embodiments, the shower tray 230 is wholly provided along the shower receptor. The shower tray 230 may further include a shower tray height (e.g., distance between a bottom of the shower tray 230 and a top of the shower tray 230) where the gray water may be stored before transferring to the gray water tank 220. The shower tray 230 may further include a sloped portion extending substantially towards a drain ring of the shower tray 230. As can be appreciated, when gray water is delivered to the top of the shower tray 230, the gray water is biased towards the drain ring so as to capture most or all of the gray water within the shower system 205.

The gray water tank 220 may be configured to filter the gray water delivered to the gray water tank 220 from the first pipe 225. The gray water tank 220 may be substantially similar to the gray water tank 120 described in the bathroom system 100 and the same description applied to the gray water tank 120 in the bathroom system 100 is applied here as if reiterated in full. As can be appreciated, the gray water tank 220 may include an internal filtration system where the gray water passes through to remove material (e.g., human matter, solids, etc.) from the gray water. Additionally or alternatively, the gray water tank 220 may introduce a chemical into the gray water to clean the gray water.

The gray water tank 220 may include an electrical connection configured to draw power from an external power supply (e.g., outlet plug, etc.). The electrical connection may be substantially similar to the electrical connection described in the bathroom system 100 and the same description applied to the electrical connection in the bathroom system 100 is applied here as if reiterated in full.

The gray water tank 220 may be configured to hold the gray water delivered to the gray water tank 220 from the first pipe 225. The gray water tank 220 may include one or more tanks contained within, that are configured to capture and hold the gray water. The one or more tanks may be substantially similar to the one or more tanks described in the bathroom system 100 and the same description applied to the one or more tanks in the bathroom system 100 is applied here as if reiterated in full.

The gray water tank 220 may further include accessory features positioned externally the gray water tank 220. For example, the gray water tank 220 may include a towel rack that is configured to hold a towel thereon. In another example, the gray water tank 220 may include a toilet paper holder that is configured to hold a roll of toilet paper thereon. In yet another example, the gray water tank 220 may include one or more storage compartments that are configured to store accessory components of the bathroom system 200 (e.g., bathroom towels, etc.) therein.

Once the one or more tanks are full, no more gray water can be stored therein.

When the toilet 215 is flushed, the gray water is supplied to the toilet 215 to assist in the performance of the flush (e.g., to provide all or a portion of the flush water, to provide replacement water to a toilet tank, to provide water to the sump to provide a pressure assist for the flushing action, etc.). The toilet 215 may be substantially similar to the toilet 115 described in the bathroom system 100 and the same description applied to the toilet 115 in the bathroom system 100 is applied here as if reiterated in full.

The gray water may be a secondary source of water for the flush. The toilet 215 further includes a primary water supply. The primary water supply may be substantially similar to the primary water supply described in the bathroom system 100 and the same description applied to the primary water supply in the bathroom system 100 is applied here as if reiterated in full.

Although it is contemplated to reuse gray water from the shower system 205, the gray water from the sink system 210 may further be transferred to the one or more tanks to assist in flushing the toilet 215. In such an embodiment, the sink system 210 may include an additional pipe that is configured to transfer the gray water from the sink system 210 to the gray water tank 220.

Wall Mount Gray Water Tank

Figure 7:
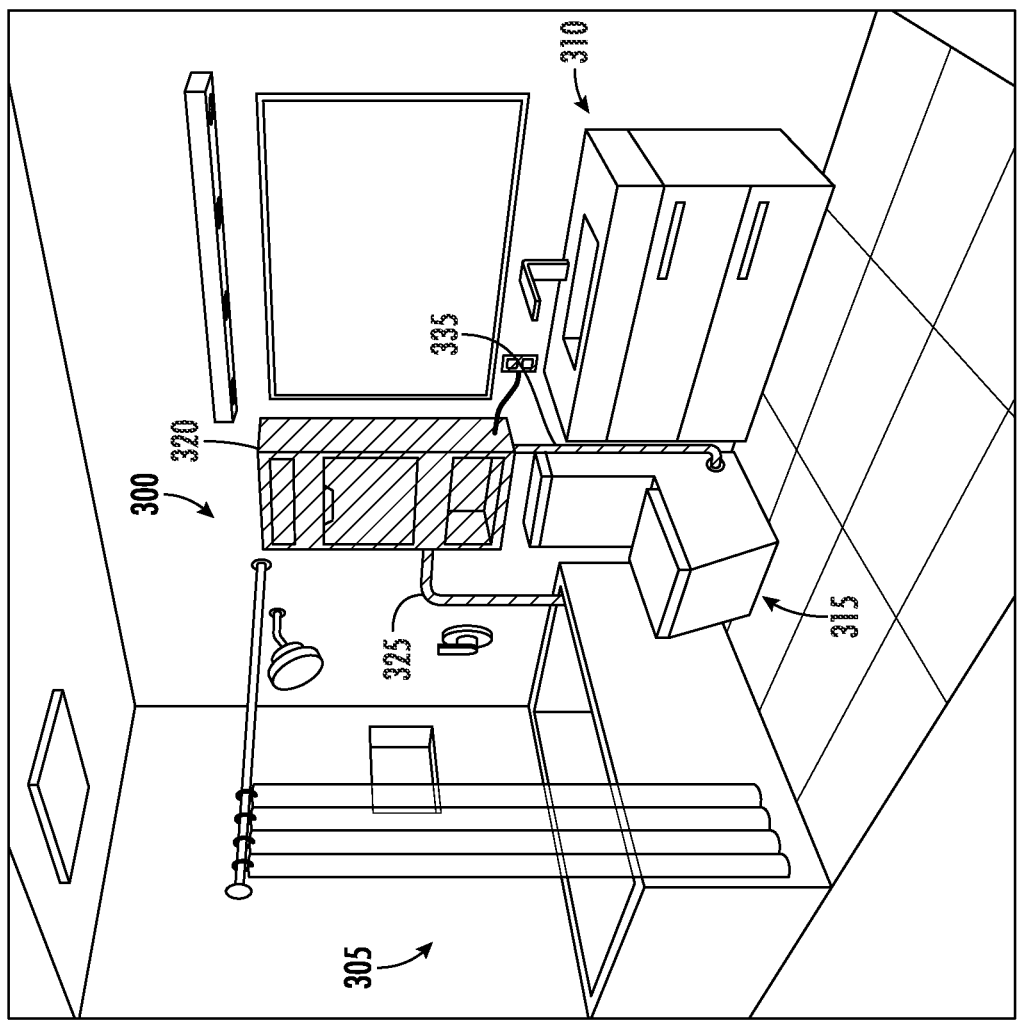
FIG. 7 is a perspective view of a bathroom system including a wall mount gray water tank, according to another exemplary embodiment.
Figure 8:
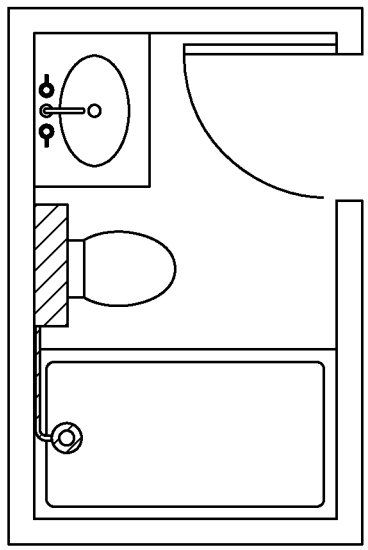
FIG. 8 is a top view of the bathroom system of FIG. 7.
Figure 9:
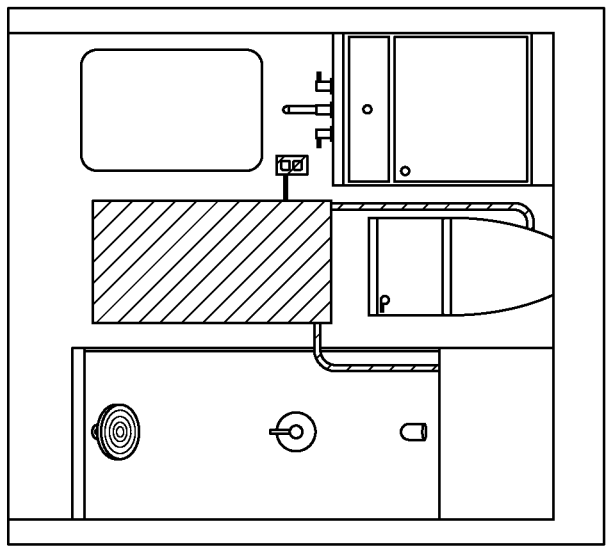
FIG. 9 is a front view of the bathroom system of FIG. 7.

Referring now to FIGS. 7-9, a bathroom system 300 is shown according to an exemplary embodiment. The bathroom system 300 includes a shower system 305, a sink system 310, and a toilet 315 positioned between the shower system 305 and the sink system 310. In other embodiments, the sink system 310 is positioned between the shower system 305 and the toilet 315. The bathroom system 300 includes a gray water tank 320. The gray water tank 320 may be positioned above the toilet 315 (although the gray water tank 320 may be provided in any suitable location). The gray water tank 320 may be one of a storage gray water tank, standalone gray water tank, filtration gray water tank, etc. The gray water tank 320 may be a prismatic gray water tank sized to tightly fit between the toilet 315 and the sink system 310. In other embodiments, the gray water tank 320 may take on a shape other than a prism.

The gray water tank 320 includes a first pipe 325 or conduit fluidly coupled to the shower system 305 and the gray water tank 320. The first pipe 325 may be substantially similar to the first pipe 125 described in the bathroom system 100 and the same description applied to the first pipe 125 in the bathroom system 100 is applied here as if reiterated in full.

The gray water tank 320 may be configured to filter the gray water delivered to the gray water tank 320 from the first pipe 325. The gray water tank 320 may be substantially similar to the gray water tank 120 described in the bathroom system 100 and the same description applied to the gray water tank 120 in the bathroom system 100 is applied here as if reiterated in full.

The gray water tank 320 may include an electrical connection configured to draw power from an external power supply (e.g., outlet plug, etc.). The electrical connection may be substantially similar to the electrical connection described in the bathroom system 100 and the same description applied to the electrical connection in the bathroom system 100 is applied here as if reiterated in full.

The gray water tank 320 may be configured hold the gray water delivered to the gray water tank 320 from the first pipe 325. The gray water tank 320 may include one or more tanks contained within, that are configured to capture and hold the gray water. The one or more tanks may be substantially similar to the one or more tanks described in the bathroom system 100 and the same description applied to the one or more tanks in the bathroom system 100 is applied here as if reiterated in full.

The gray water tank 320 includes a second pipe 335 fluidly coupled to the gray water tank 320 and the toilet 315. The second pipe 335 may be a water outlet, where gray water is delivered to the toilet 315 from the gray water tank 320. The second pipe 335 is configured to transfer gray water stored within the one or more tanks to the toilet 315. That is, the second pipe 335 may deliver gray water to a reservoir (e.g., sump, etc.) of the toilet 315 so that the gray water may be used during a flush. The second 335 pipe may be an external pipe that vertically extends from a bottom portion of the gray water tank 320.

The gray water tank 320 may include one or more storage compartments disposed therein. The one or more storage compartments may be configured to store accessory components of the bathroom system 300. For example, the one or more storage compartments may be configured to store bathroom towels, toilet paper, cleaning products, or the like. Additionally or alternatively, the gray water tank 320 may further include accessory features positioned externally the gray water tank 320. For example, the gray water tank 320 may include a towel rack that is configured to hold a towel thereon.

Once the one or more tanks are full, no more gray water can be stored therein.

When the toilet 315 is flushed, the gray water is supplied to the toilet 315 to assist in the performance of the flush (e.g., to provide all or a portion of the flush water, to provide replacement water to a toilet tank, to provide water to the sump to provide a pressure assist for the flushing action, etc.). The toilet 315 may be substantially similar to the toilet 115 described in the bathroom system 100 and the same description applied to the toilet 115 in the bathroom system 100 is applied here as if reiterated in full.

The gray water may be a secondary source of water for the flush. The toilet 315 further includes a primary water supply. The primary water supply may be a traditional water supply. The primary water supply may be substantially similar to the primary water supply described in the bathroom system 100 and the same description applied to the primary water supply in the bathroom system 100 is applied here as if reiterated in full.

Although it is contemplated to reuse gray water from the shower system, the gray water from the sink system 310 may further be transferred to the one or more tanks to assist in flushing the toilet 315. In such an embodiment, the sink system 310 may include an additional pipe that is configured to transfer the gray water from the sink system 310 to the gray water tank.

Wall Mount Gray Water Tank and Shower Tray

Figure 10:
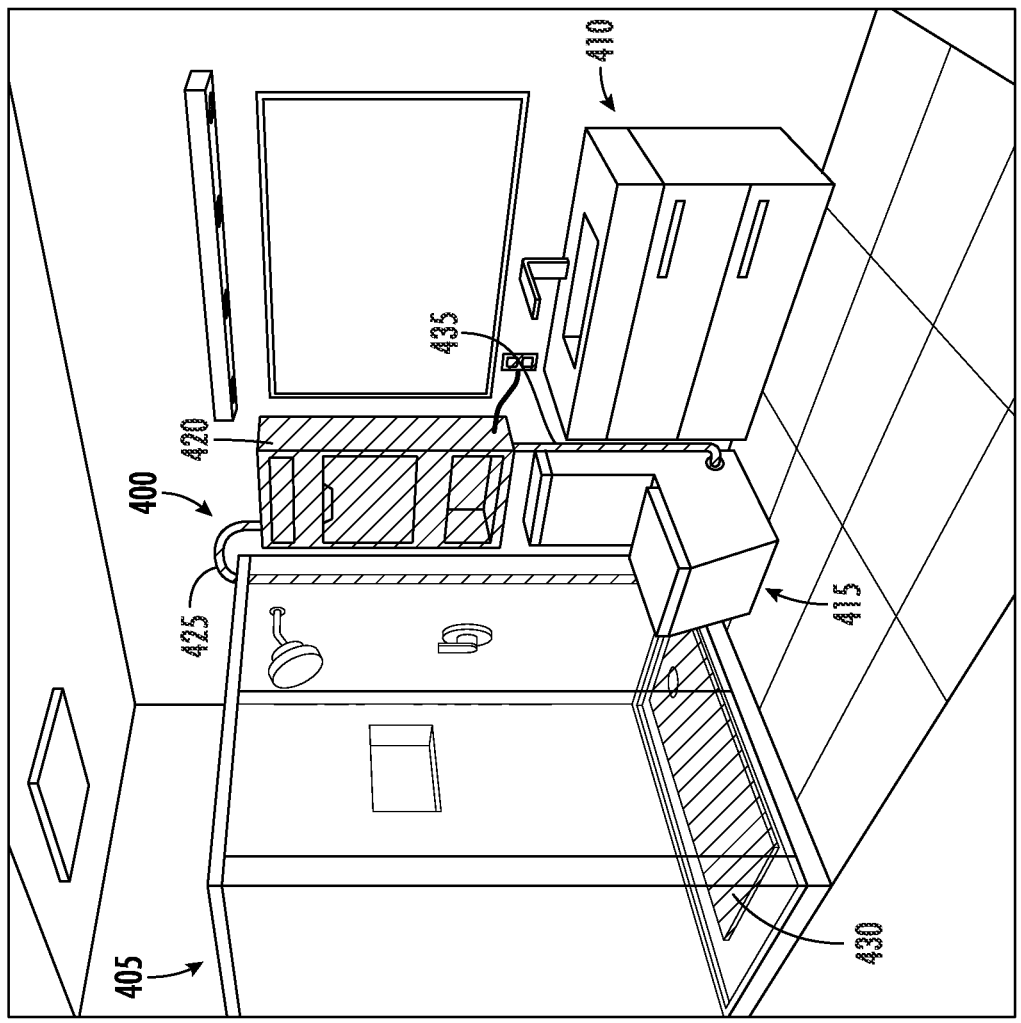
FIG. 10 is a perspective view of a bathroom system including a wall mount gray water tank and a shower tray, according to another exemplary embodiment.
Figure 11:
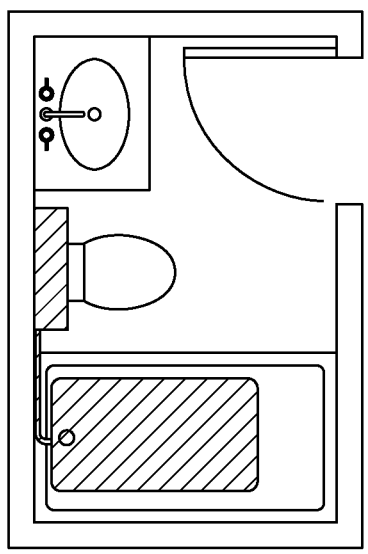
FIG. 11 is a top view of the bathroom system of FIG. 10.
Figure 12:
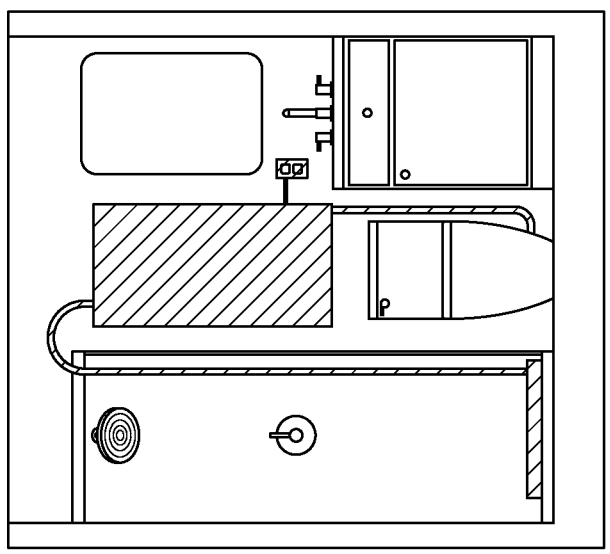
FIG. 12 is a front view of the bathroom system of FIG. 10.

Referring now to FIGS. 10-12, a bathroom system 400 is shown, according to an exemplary embodiment. The bathroom system 400 includes a shower system 405, a sink system 410, and a toilet 415 positioned between the shower system 405 and the sink system 410. In other embodiments, the sink system 410 is positioned between the shower system 410 and the toilet 415. The bathroom system 400 includes a gray water tank 420. The gray water tank 420 may be positioned above the toilet 415 (although the gray water tank may be provided in any suitable location). The gray water tank 420 may be one of a storage gray water tank, standalone gray water tank, filtration gray water tank, etc. The gray water tank 420 may be a prismatic gray water tank sized to tightly fit between the toilet 415 and the sink system 410. In other embodiments, the gray water tank 420 may take on a shape other than a prism.

The gray water tank 420 includes a first pipe 425 or conduit fluidly coupled to the shower system 405 and the gray water tank 420. The first pipe 425 may be a water inlet, where gray water is delivered to the gray water tank 420 from the shower system 405. The first pipe 425 is configured to capture the gray water via a shower tray 430 and deliver the gray water to the gray water tank 420. Additionally or alternatively, the first pipe 425 may be configured to capture fluid (e.g., clean water, etc.) via the shower tray 430 and deliver the fluid to the gray water tank 420. The first pipe 425 may be an external pipe that is positioned along a sidewall of the bathroom. As shown in FIG. 10, the first pipe extends over top of a sidewall of the shower system 405 and is further positioned rearward the toilet 415. The first pipe 425 is coupled to the gray water tank 420 proximate a bottom edge of the gray water tank 420. In other embodiments, the first pipe 425 is coupled to the gray water tank 420 distal the bottom edge of the gray water tank 420.

The shower tray 430 may be a tray positioned within the shower system 405 where the shower tray 430 is provided along a portion of a shower receptor. In other embodiments, the shower tray 430 is wholly provided along the shower receptor. The shower tray 430 may further include a shower tray height (e.g., distance between a bottom of the shower tray and a top of the shower tray) where the gray water may be stored before transferring to the gray water tank 420. The shower tray 430 may further include a sloped portion extending substantially towards a drain ring of the shower tray 430. As can be appreciated, when gray water is applied to the top of the shower tray 430, the gray water is biased towards the drain ring such to capture most of the gray water within the shower system 405.

The gray water tank 420 may be configured to filter the gray water delivered to the gray water tank 420 from the first pipe 425. The gray water tank 420 may be substantially similar to the gray water tank 120 described in the bathroom system 100 and the same description applied to the gray water tank 120 in the bathroom system 100 is applied here as if reiterated in full.

The gray water tank 420 may include an electrical connection configured to draw power from an external power supply (e.g., outlet plug, etc.). The electrical connection may be substantially similar to the electrical connection described in the bathroom system 100 and the same description applied to the electrical connection in the bathroom system 100 is applied here as if reiterated in full.

The gray water tank 420 may be configured hold the gray water delivered to the gray water tank 420 from the first pipe 425. The gray water tank 420 may include one or more tanks contained within, that are configured to capture and hold the gray water. The one or more tanks may be substantially similar to the one or more tanks described in the bathroom system 100 and the same description applied to the one or more tanks in the bathroom system 100 is applied here as if reiterated in full.

The gray water tank 420 includes a second pipe 435 fluidly coupled to the gray water tank 420 and the toilet 415. The second pipe 435 may be a water outlet, where gray water is delivered to the toilet 415 from the gray water tank 420. The second pipe 435 is configured to transfer gray water stored within the one or more tanks to the toilet 415. That is, the second pipe 435 may deliver gray water to a reservoir (e.g., sump, etc.) of the toilet 415 so that the gray water may be used during a flush. The second pipe 435 may be an external pipe that vertically extends from a bottom portion of the gray water tank 420.

The gray water tank 420 may include one or more storage compartments disposed therein. The one or more storage compartments may be configured to store accessory components of the bathroom system 400. For example, the one or more storage compartments may be configured to store bathroom towels, toilet paper, cleaning products, or the like. Additionally or alternatively, the gray water tank 420 may further include accessory features positioned externally the gray water tank 420. For example, the gray water tank 420 may include a towel rack that is configured to hold a towel thereon.

Once the one or more tanks are full, no more gray water can be stored therein.

When the toilet 415 is flushed, the gray water is supplied to the toilet 415 to assist in the performance of the flush (e.g., to provide all or a portion of the flush water, to provide replacement water to a toilet tank, to provide water to the sump to provide a pressure assist for the flushing action, etc.). The toilet 415 may be substantially similar to the toilet 115 described in the bathroom system 100 and the same description applied to the toilet 115 in the bathroom system 100 is applied here as if reiterated in full.

The gray water may be a secondary source of water for the flush. The toilet 415 further includes a primary water supply. The primary water supply may be a traditional water supply. The primary water supply may be substantially similar to the primary water supply described in the bathroom system 100 and the same description applied to the primary water supply in the bathroom system 100 is applied here as if reiterated in full.

Although it is contemplated to reuse gray water from the shower system 405, the gray water from the sink system 410 may further be transferred to the one or more tanks to assist in flushing the toilet 415. In such an embodiment, the sink system 410 may include an additional pipe that is configured to transfer the gray water from the sink system 410 to the gray water tank 420.

Hidden Gray Water Tank with Control

Figure 13:
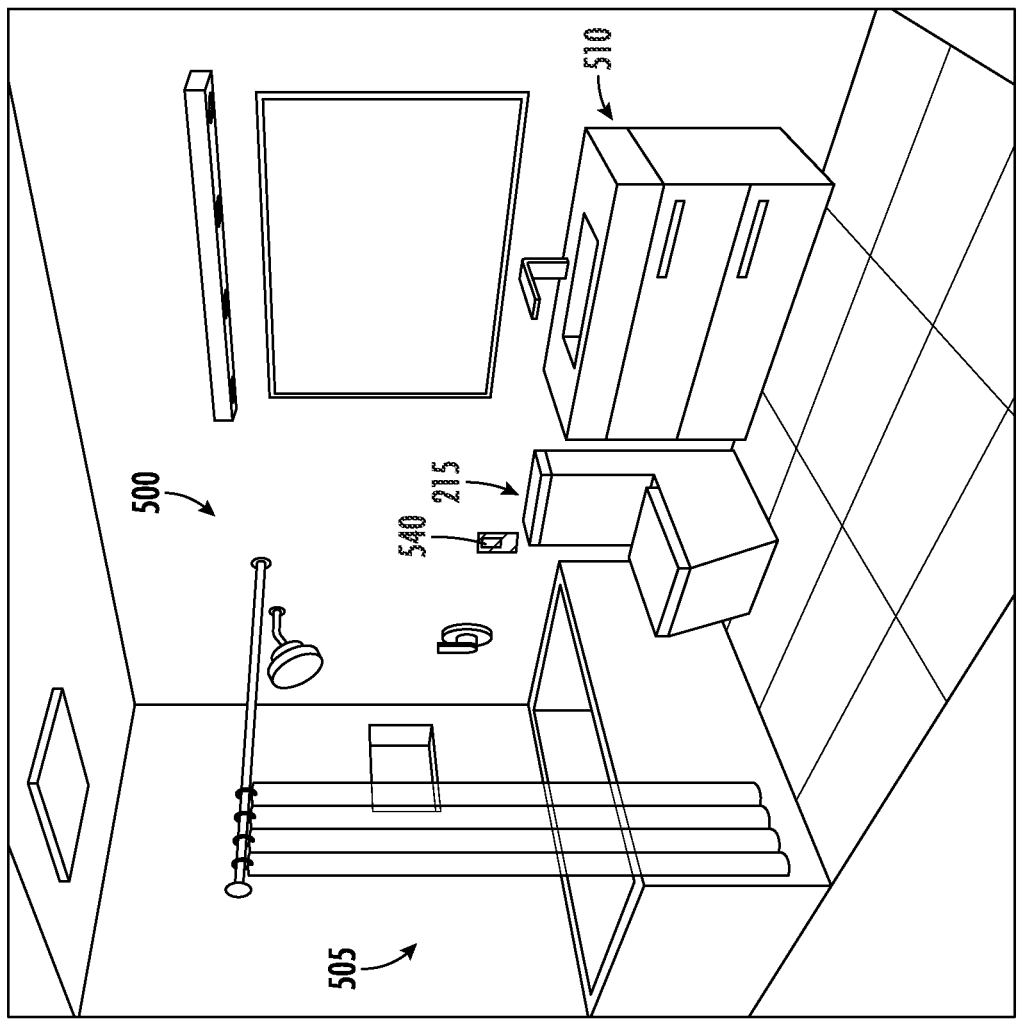
FIG. 13 is a perspective view of a bathroom system including a hidden gray water tank with a control, according to another exemplary embodiment.
Figure 14:
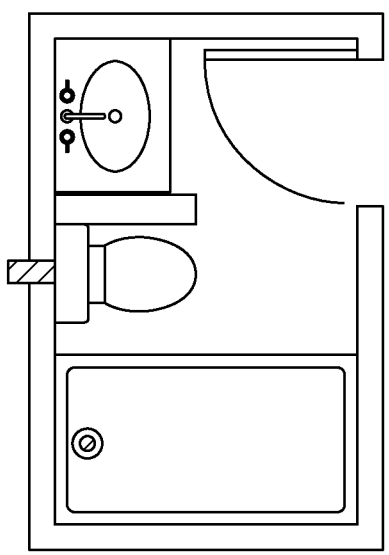
FIG. 14 is a top view of the bathroom system of FIG. 13.
Figure 15:
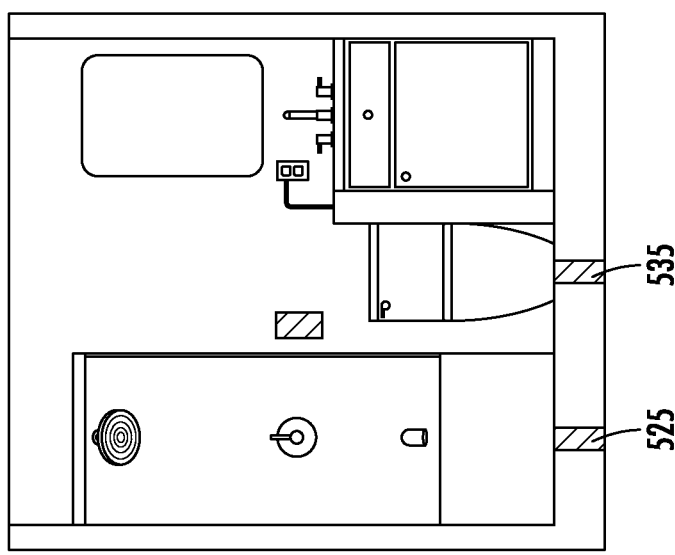
FIG. 15 is a front view of the bathroom system of FIG. 13.

Referring now to FIGS. 13-15, a bathroom system 500 is shown, according to an exemplary embodiment. The bathroom system 500 includes a shower system 505, a sink system 510, and a toilet 515 positioned between the shower system 505 and the sink system 510. In other embodiments, the sink system 510 is positioned between the shower system 505 and the toilet 515. Although not shown, the bathroom system 500 includes a gray water tank. The gray water tank may be positioned external the bathroom system 500 (e.g., in another room, beneath the bathroom system 500, above the bathroom system 500, etc.). The gray water tank may take on any geometrical configuration to filter or clean gray water delivered to the gray water tank.

The bathroom system 500 includes a first pipe 525 or conduit fluidly coupled to the shower system 505 and the gray water tank. The first pipe 525 may be substantially similar to the first pipe 125 described in the bathroom system 100 and the same description applied to the first pipe 125 in the bathroom system 100 is applied here as if reiterated in full.

The gray water tank may be configured to filter the gray water delivered to the gray water tank from the first pipe 525. The gray water tank may be substantially similar to the gray water tank described in the bathroom system 100 and the same description applied to the gray water tank in the bathroom system 100 is applied here as if reiterated in full.

The gray water tank may include an electrical connection configured to draw power from an external power supply (e.g., outlet plug, etc.). The electrical connection may be substantially similar to the electrical connection described in the bathroom system 100 and the same description applied to the electrical connection in the bathroom system 100 is applied here as if reiterated in full.

The gray water tank may be configured hold the gray water delivered to the gray water tank from the first pipe 525. The gray water tank may include one or more tanks contained within, that are configured to capture and hold the gray water. The one or more tanks may be substantially similar to the one or more tanks described in the bathroom system 100 and the same description applied to the one or more tanks in the bathroom system 100 is applied here as if reiterated in full.

The gray water tank includes a second pipe 535 fluidly coupled to the gray water tank and the toilet 515. The second pipe 535 may be a water outlet, where gray water is delivered to the toilet 515 from the gray water tank. The second pipe 535 is configured to transfer gray water stored within the one or more tanks to the toilet 515. That is, the second pipe 535 may deliver gray water to a reservoir (e.g., sump, etc.) of the toilet 515 so that the gray water may be used during a flush. The second pipe 535 may be an internal pipe that vertically extends from the gray water tank to a bottom of the toilet 515.

Once the one or more tanks are full, no more gray water can be stored therein.

When the toilet 515 is flushed, the gray water is supplied to the toilet 515 to assist in the performance of the flush (e.g., to provide all or a portion of the flush water, to provide replacement water to a toilet tank, to provide water to the sump to provide a pressure assist for the flushing action, etc.). The toilet 515 may be substantially similar to the toilet 115 described in the bathroom system 100 and the same description applied to the toilet 115 in the bathroom system 100 is applied here as if reiterated in full.

The gray water may be a secondary source of water for the flush. The toilet 515 further includes a primary water supply. The primary water supply may be a traditional water supply. The primary water supply may be substantially similar to the primary water supply described in the bathroom system 100 and the same description applied to the primary water supply in the bathroom system 100 is applied here as if reiterated in full.

The bathroom system 500 may include a user interface 540 positioned on a sidewall of the bathroom system 500. The user interface 540 may be a control and feedback interface, where a user may interact with the user interface to determine a status of the gray water tank. The status may be one of a fill level in the one or more tanks, an on/off control of the gray water tank, or the like. The user interface 540 may be positioned on a sidewall of the bathroom system 500 between the shower system 505 and the toilet 515. In other embodiments, the user interface 540 may be positioned along any sidewall of the bathroom system 500.

Although it is contemplated to reuse gray water from the shower system 505, the gray water from the sink system 510 may further be transferred to the one or more tanks to assist in flushing the toilet 515. In such an embodiment, the sink system 510 may include an additional pipe that is configured to transfer the gray water from the sink system 510 to the gray water tank.

Hidden Gray Water Tank

Figure 16:
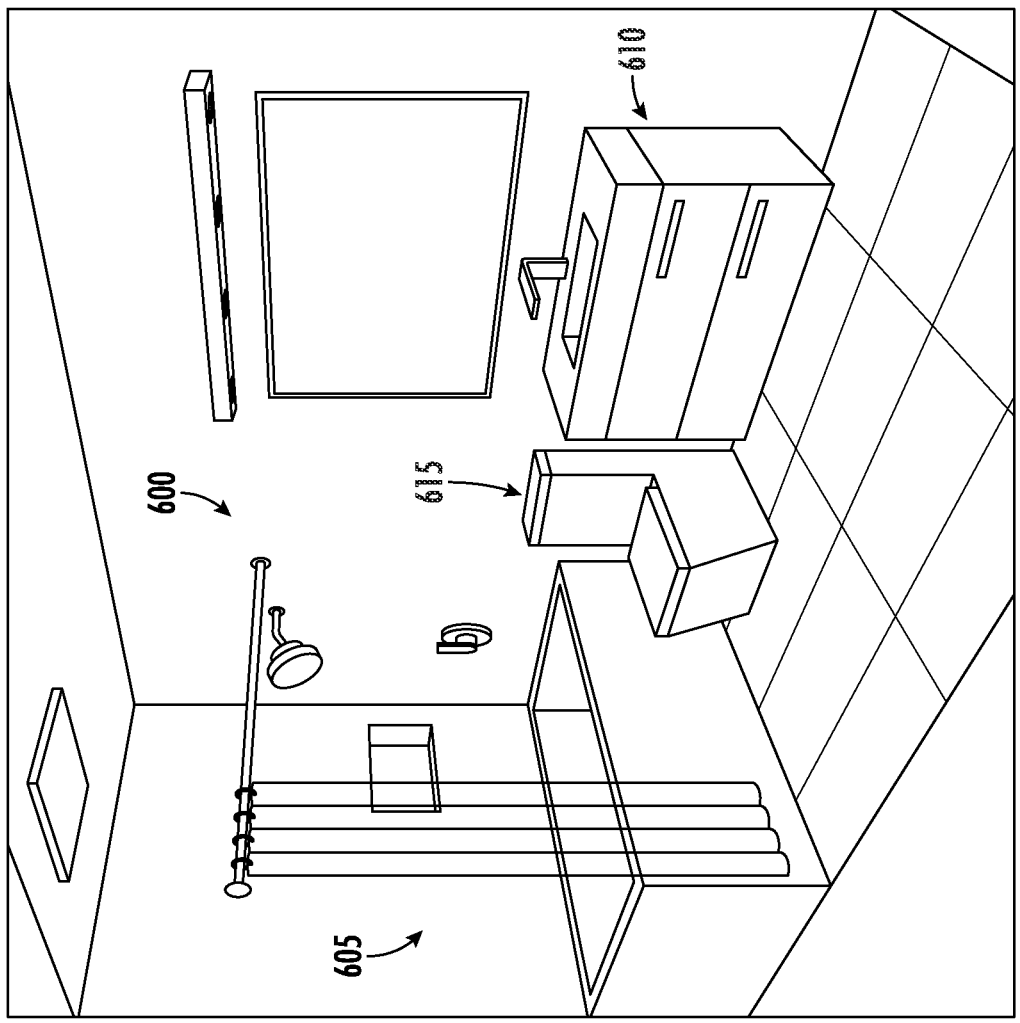
FIG. 16 is a perspective view of a bathroom system including a hidden gray water tank, according to another exemplary embodiment.
Figure 17:
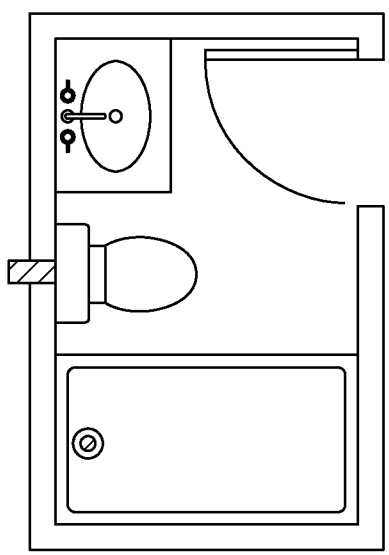
FIG. 17 is a top view of the bathroom system of FIG. 16.
Figure 18:
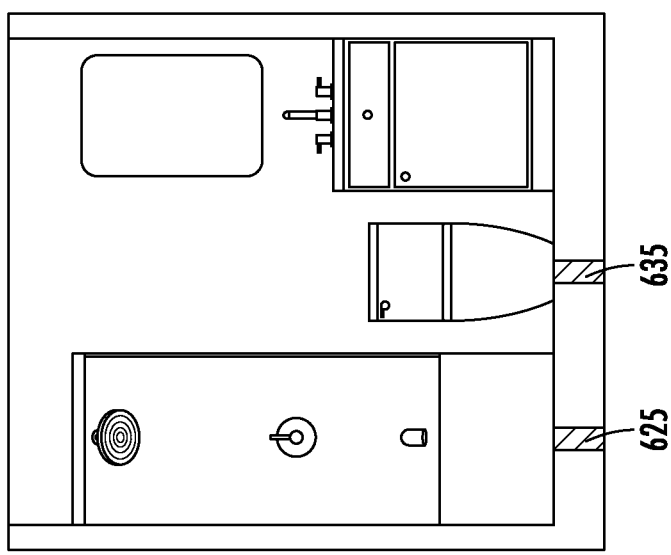
FIG. 18 is a front view of the bathroom system of FIG. 16.

Referring now to FIGS. 16-18, a bathroom system 600 is shown, according to an exemplary embodiment. The bathroom system 600 includes a shower system 605, a sink system 610, and a toilet 615 positioned between the shower system 605 and the sink system 610. In other embodiments, the sink system 610 is positioned between the shower system 605 and the toilet 615. Although not shown, the bathroom system 600 includes a gray water tank. The gray water tank may be positioned external the bathroom system 600 (e.g., in another room, beneath the bathroom system 600, above the bathroom system 600, etc.). The gray water tank may take on any geometrical configuration to filter or clean gray water delivered to the gray water tank.

The bathroom system 600 includes a first pipe 625 or conduit fluidly coupled to the shower system 605 and the gray water tank. The first pipe 625 may be substantially similar to the first pipe 125 described in the bathroom system 100 and the same description applied to the first pipe 125 in the bathroom system 100 is applied here as if reiterated in full. The first pipe 625 may be an internal pipe that is positioned beneath the shower system 605. As shown in FIG. 18, the first pipe 625 vertically extends from the drain ring in the shower system 605, where substantially all of the gray water is collected therein.

The gray water tank may be configured to filter the gray water delivered to the gray water tank from the first pipe 625. As can be appreciated, the gray water tank may include an internal filtration system where the gray water passes through to remove material (e.g., human matter, solids, etc.) from the gray water. Additionally or alternatively, the gray water tank may introduce a chemical into the gray water to clean the gray water.

The gray water tank may include an electrical connection configured to draw power from an external power supply (e.g., outlet plug, etc.). The electrical connection may be substantially similar to the electrical connection described in the bathroom system 100 and the same description applied to the electrical connection in the bathroom system 100 is applied here as if reiterated in full.

The gray water tank may be configured hold the gray water delivered to the gray water tank from the first pipe 625. The gray water tank may be substantially similar to the gray water tank 120 described in the bathroom system 100 and the same description applied to the gray water tank 120 in the bathroom system 100 is applied here as if reiterated in full.

The gray water tank includes a second pipe 635 fluidly coupled to the gray water tank and the toilet 615. The second pipe 635 may be a water outlet, where gray water is delivered to the toilet 615 from the gray water tank. The second pipe 635 is configured to transfer gray water stored within the one or more tanks to the toilet 615. That is, the second pipe 635 may deliver gray water to a reservoir (e.g., sump, etc.) of the toilet 615 so that the gray water may be used during a flush. The second pipe 635 may be an internal pipe that vertically extends from the gray water tank to a bottom of the toilet 615.

Once the one or more tanks are full, no more gray water can be stored therein.

When the toilet 615 is flushed, the gray water is supplied to the toilet 615 to assist in the performance of the flush (e.g., to provide all or a portion of the flush water, to provide replacement water to a toilet tank, to provide water to the sump to provide a pressure assist for the flushing action, etc.). The toilet 615 may be substantially similar to the toilet 115 described in the bathroom system 100 and the same description applied to the toilet 115 in the bathroom system 100 is applied here as if reiterated in full.

The gray water may be a secondary source of water for the flush. The toilet 615 further includes a primary water supply. The primary water supply may be a traditional water supply. The primary water supply may be substantially similar to the primary water supply described in the bathroom system 100 and the same description applied to the primary water supply in the bathroom system 100 is applied here as if reiterated in full.

Although it is contemplated to reuse gray water from the shower system 605, the gray water from the sink system 610 may further be transferred to the one or more tanks to assist in flushing the toilet 615. In such an embodiment, the sink system 610 may include an additional pipe that is configured to transfer the gray water from the sink system 610 to the gray water tank.

In-Wall Hidden Gray Water Tank

Figure 19:
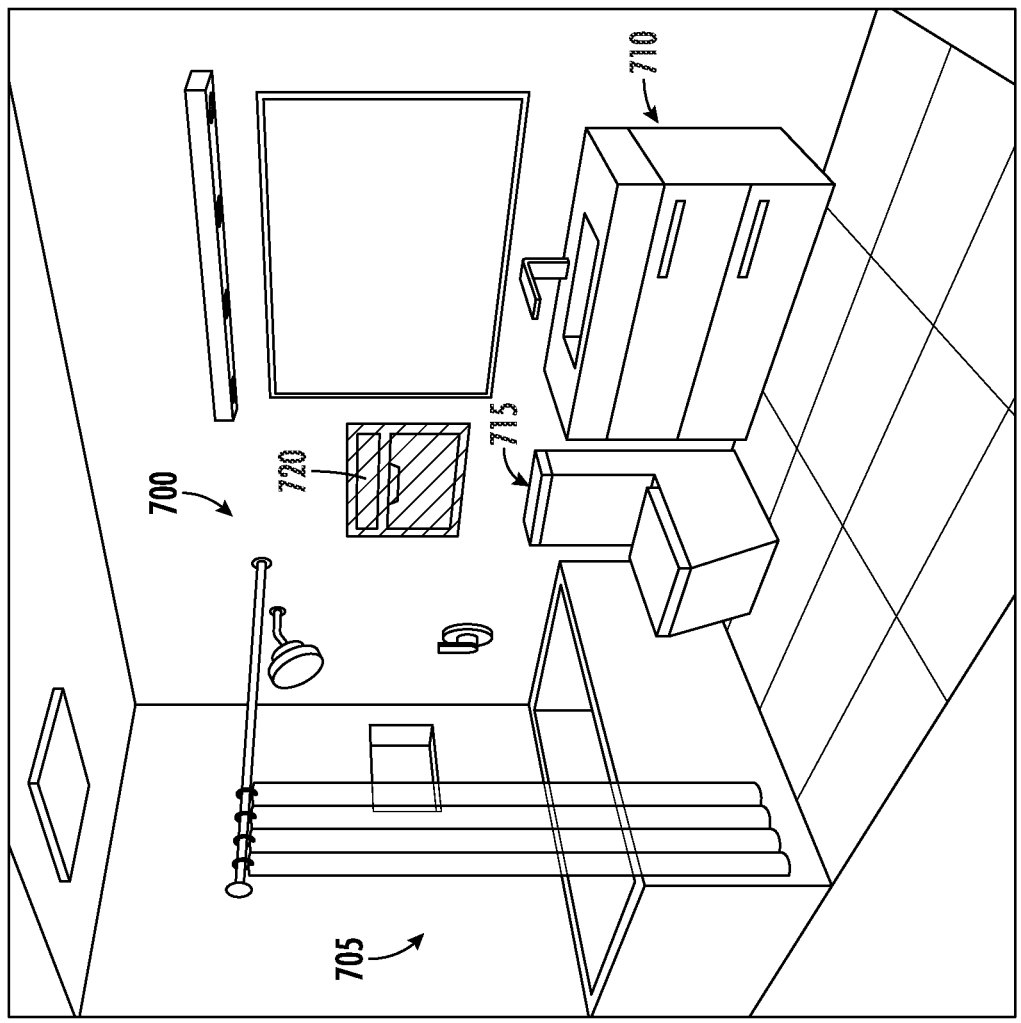
FIG. 19 is a perspective view of a bathroom system including an in-wall hidden gray water tank, according to another exemplary embodiment.
Figure 20:
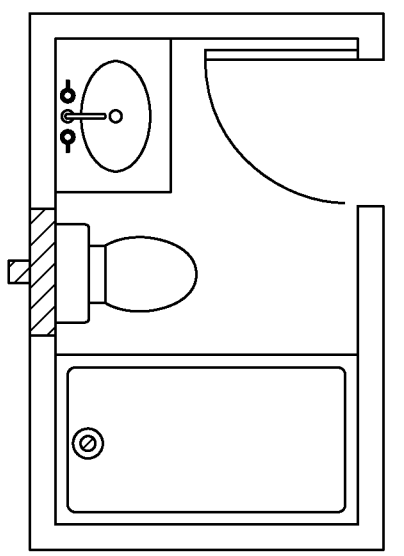
FIG. 20 is a top view of the bathroom system of FIG. 19.
Figure 21:
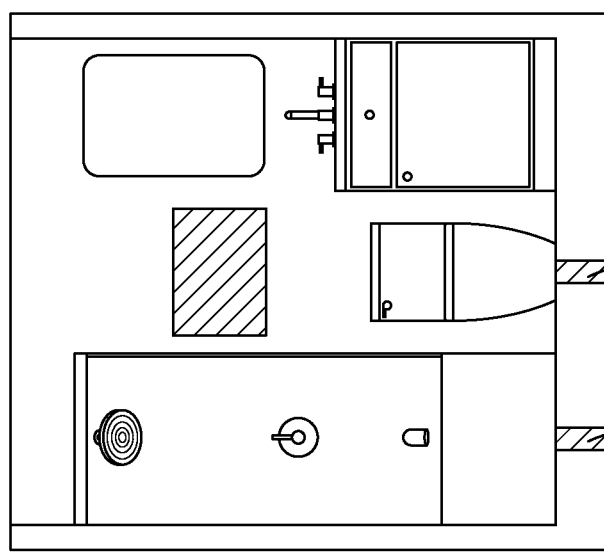
FIG. 21 is a front view of the bathroom system of FIG. 19.

Referring now to FIGS. 19-21, a bathroom system 700 is shown, according to an exemplary embodiment. The bathroom system 700 includes a shower system 705, a sink system, 710 and a toilet 715 positioned between the shower system 705 and the sink system 710. In other embodiments, the sink system 710 is positioned between the shower system 705 and the toilet 715. The bathroom system 700 includes a gray water tank 720. The gray water tank 720 may be recessed within a sidewall of the bathroom system 700 (although the gray water tank 720 may be provided in any suitable location). The gray water tank 720 may be one of a storage gray water tank, filtration gray water tank, etc. The gray water tank 720 may be a prismatic gray water tank sized to tightly fit within the sidewall of the bathroom system 700. In other embodiments, the gray water tank 720 may take on a shape other than a prism.

The bathroom system 700 includes a first pipe 725 or conduit fluidly coupled to the shower system and the gray water tank. The first pipe 725 may be substantially similar to the first pipe 125 described in the bathroom system 100 and the same description applied to the first pipe 125 in the bathroom system 100 is applied here as if reiterated in full. The first pipe 725 may be an internal pipe that is positioned beneath the shower system 705. As shown in FIG. 21, the first pipe 725 vertically extends from the drain ring in the shower system 705, where substantially all of the gray water is collected therein.

The gray water tank 720 may be configured to filter the gray water delivered to the gray water tank 720 from the first pipe 725. The gray water tank 720 may be substantially similar to the gray water tank 120 described in the bathroom system 100 and the same description applied to the gray water tank 120 in the bathroom system 100 is applied here as if reiterated in full.

Although not shown, the gray water tank 720 may include an electrical connection configured to draw power from an external power supply (e.g., outlet plug, etc.). The electrical connection may be substantially similar to the electrical connection described in the bathroom system 100 and the same description applied to the electrical connection in the bathroom system 100 is applied here as if reiterated in full.

The gray water tank 720 may be configured hold the gray water delivered to the gray water tank 720 from the first pipe 725. The gray water tank 720 may include one or more tanks contained within, that are configured to capture and hold the gray water. The one or more tanks may be substantially similar to the one or more tanks described in the bathroom system 100 and the same description applied to the one or more tanks in the bathroom system 100 is applied here as if reiterated in full.

The gray water tank 720 includes a second pipe 735 fluidly coupled to the gray water tank 720 and the toilet 715. The second pipe 735 may be a water outlet, where gray water is delivered to the toilet 715 from the gray water tank 720. The second pipe 735 is configured to transfer gray water stored within the one or more tanks to the toilet 715.

That is, the second pipe 735 may deliver gray water to a reservoir (e.g., sump, etc.) of the toilet 715 so that the gray water may be used during a flush. The second pipe 735 may be an internal pipe that vertically extends from the gray water tank 720 to a bottom of the toilet 715.

The gray water tank 720 may include one or more storage compartments disposed therein. The one or more storage compartments may be configured to store accessory components of the bathroom system 700. For example, the one or more storage compartments may be configured to store bathroom towels, toilet paper, cleaning products, or the like.

Once the one or more tanks are full, no more gray water can be stored therein.

When the toilet 715 is flushed, the gray water is supplied to the toilet 715 to assist in the performance of the flush (e.g., to provide all or a portion of the flush water, to provide replacement water to a toilet tank, to provide water to the sump to provide a pressure assist for the flushing action, etc.). The toilet 715 may be substantially similar to the toilet 115 described in the bathroom system 100 and the same description applied to the toilet 115 in the bathroom system 100 is applied here as if reiterated in full.

The gray water may be a secondary source of water for the flush. The toilet 715 further includes a primary water supply. The primary water supply may be a traditional water supply. The primary water supply may be substantially similar to the primary water supply described in the bathroom system 100 and the same description applied to the primary water supply in the bathroom system 100 is applied here as if reiterated in full.

Although it is contemplated to reuse gray water from the shower system 705, the gray water from the sink system 710 may further be transferred to the one or more tanks to assist in flushing the toilet 715. In such an embodiment, the sink system 710 may include an additional pipe that is configured to transfer the gray water from the sink system 710 to the gray water tank 720.

Fixture Replacement

Figure 22:
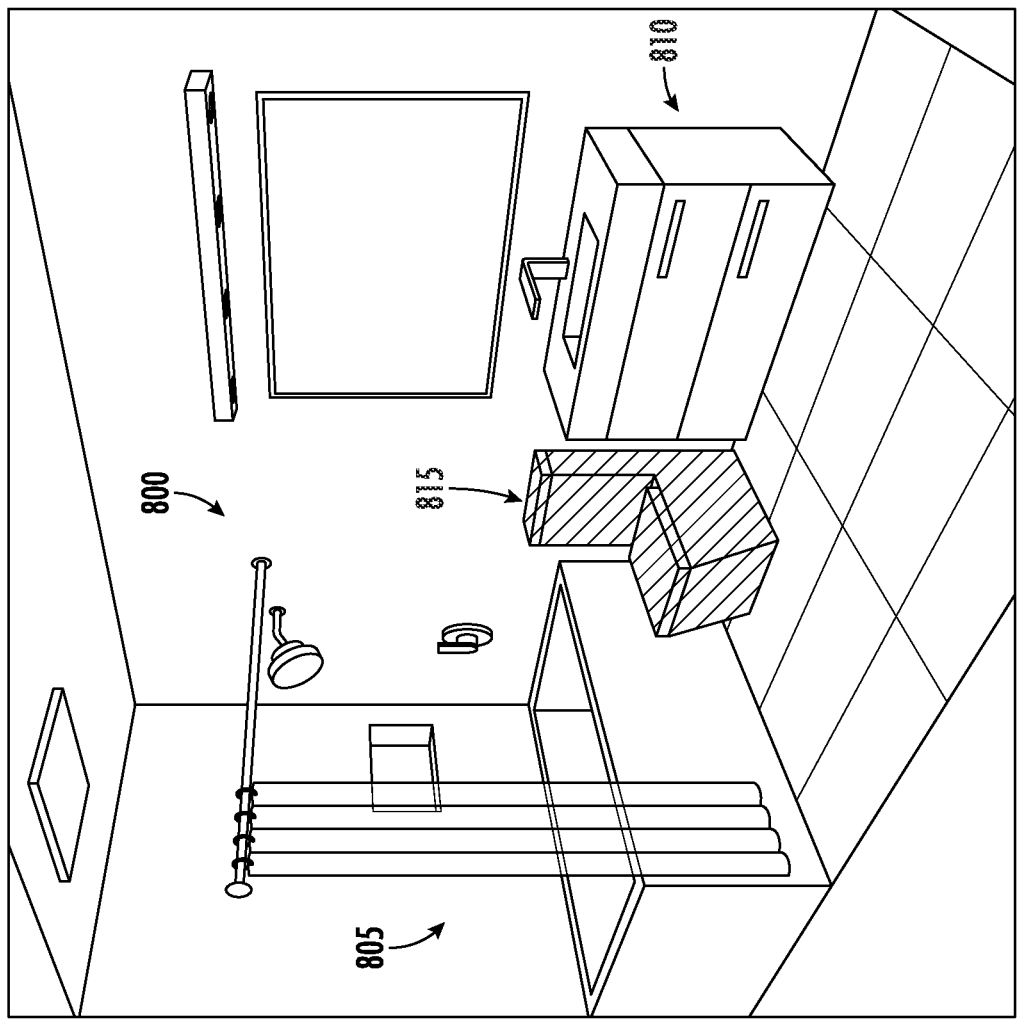
FIG. 22 is a perspective view of a bathroom system including a fixture replacement, according to another exemplary embodiment.
Figure 23:
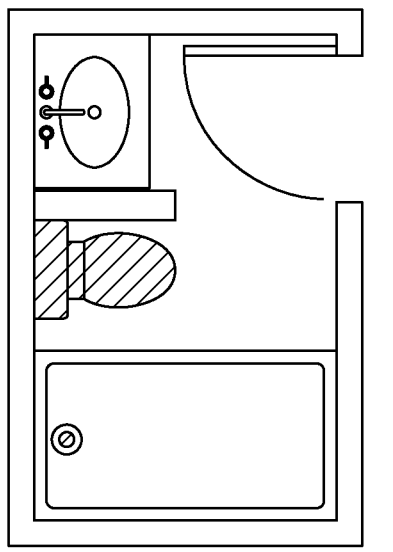
FIG. 23, is a top view of the bathroom system of FIG. 22.
Figure 24:
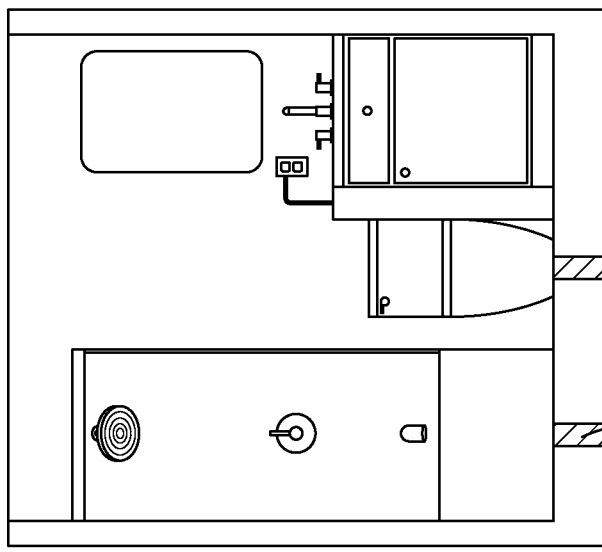
FIG. 24 is a front view of the bathroom system of FIG. 22.

Referring now to FIGS. 22-24, a bathroom system 800 is shown, according to an exemplary embodiment. The bathroom system 800 includes a shower system 805, a sink system 810, and a toilet 815 positioned between the shower system 805 and the sink system 810. In other embodiments, the sink system 810 is positioned between the shower system 805 and the toilet 815. Although not shown, the toilet 815 includes a gray water tank disposed therein. The gray water tank may be at least one of a storage and a filtration gray water tank.

The bathroom system 800 includes a first pipe 825 or conduit fluidly coupled to the shower system 805 and the toilet 815. Specifically, the first pipe 825 is fluidly coupled to the shower system 805 and the gray water tank disposed within the toilet 815. The first pipe 825 may be substantially similar to the first pipe 125 described in the bathroom system 100 and the same description applied to the first pipe 125 in the bathroom system 100 is applied here as if reiterated in full. The first pipe 825 may be an internal pipe that is positioned beneath the shower system 805. As shown in FIG. 24, the first pipe 825 vertically extends from the drain ring in the shower system 805, where substantially all of the gray water is collected therein.

The gray water tank may be configured to filter the gray water delivered to the gray water tank from the first pipe 825. The gray water tank may be substantially similar to the gray water tank 120 described in the bathroom system 100 and the same description applied to the gray water tank 120 in the bathroom system 100 is applied here as if reiterated in full.

The gray water tank may include an electrical connection configured to draw power from an external power supply (e.g., outlet plug, etc.). The electrical connection may be substantially similar to the electrical connection described in the bathroom system 100 and the same description applied to the electrical connection in the bathroom system 100 is applied here as if reiterated in full.

The gray water tank may be configured hold the gray water delivered to the gray water tank from the first pipe 825. The gray water tank may include one or more tanks contained within, that are configured to capture and hold the gray water. The one or more tanks may be substantially similar to the one or more tanks described in the bathroom system 100 and the same description applied to the one or more tanks in the bathroom system 100 is applied here as if reiterated in full. Once the one or more tanks are full, no more gray water can be stored therein.

When the toilet 815 is flushed, the gray water is supplied to the toilet 815 to assist in the performance of the flush (e.g., to provide all or a portion of the flush water, to provide replacement water to a toilet tank, to provide water to the sump to provide a pressure assist for the flushing action, etc.). The toilet 815 may be substantially similar to the toilet 115 described in the bathroom system 100 and the same description applied to the toilet 115 in the bathroom system 100 is applied here as if reiterated in full.

The gray water may be a secondary source of water for the flush. The toilet 815 further includes a primary water supply. The primary water supply may be a traditional water supply. The primary water supply may be substantially similar to the primary water supply described in the bathroom system 100 and the same description applied to the primary water supply in the bathroom system 100 is applied here as if reiterated in full.

According to an exemplary embodiment, the bathroom system 800 described above may not be assembled into any existing bathroom system. In order to install the bathroom system 800, at least a portion of the existing bathroom system would need to be remodeled. For example, in bathroom systems where the bathroom plumbing is external, the shower system, toilet, and at least a portion of the floor may need to be remodeled to position the bathroom plumbing internal and routed from the shower system to the toilet. Further, the toilet may need to be replaced to update to a toilet including the gray water tank for reusing gray water.

Although it is contemplated to reuse gray water from the shower system 805, the gray water from the sink system 810 may further be transferred to the one or more tanks to assist in flushing the toilet 815. In such an embodiment, the sink system 810 may include an additional pipe that is configured to transfer the gray water from the sink system 810 to the gray water tank.

Shower Tray Water Filtration and Storage Gray Water Tank

Figure 25:
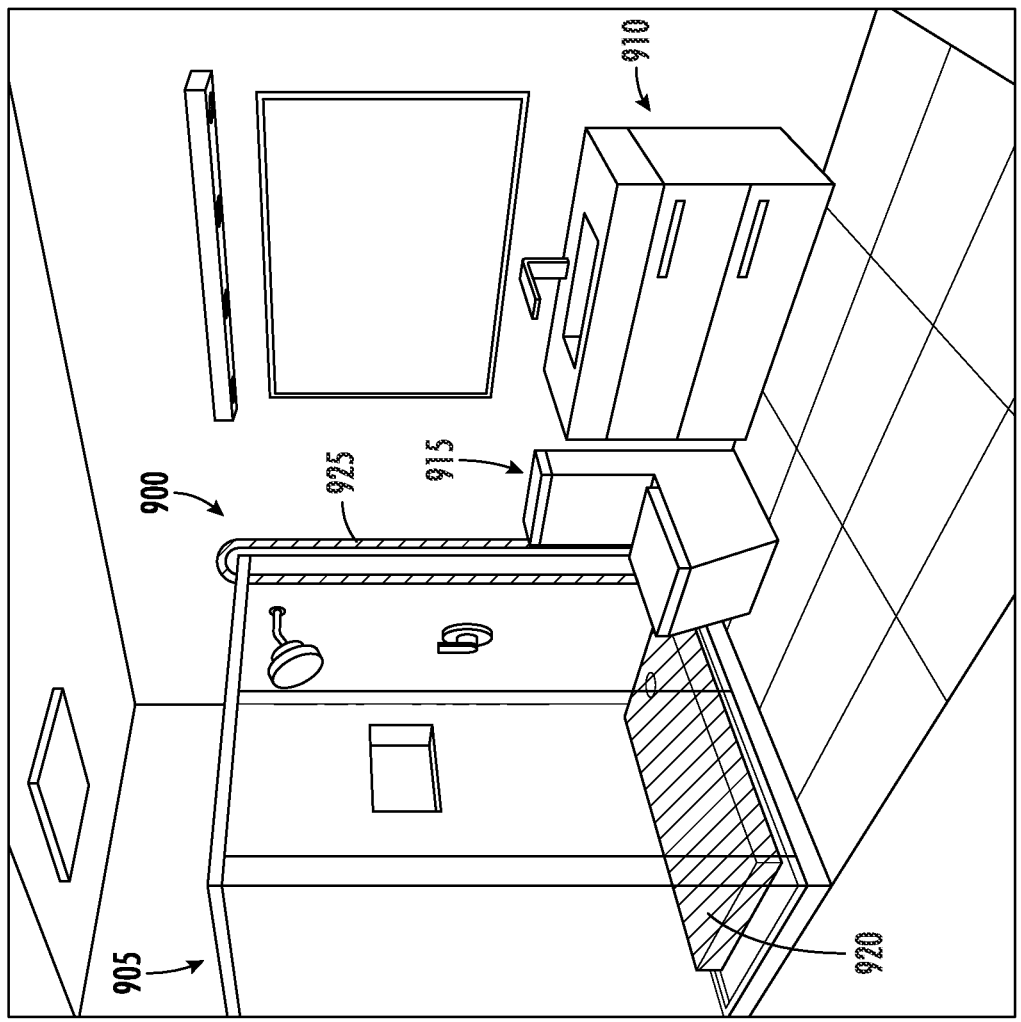
FIG. 25 is a perspective view of a bathroom system including a shower tray water filtration and storage gray water tank, according to another exemplary embodiment.
Figure 26:
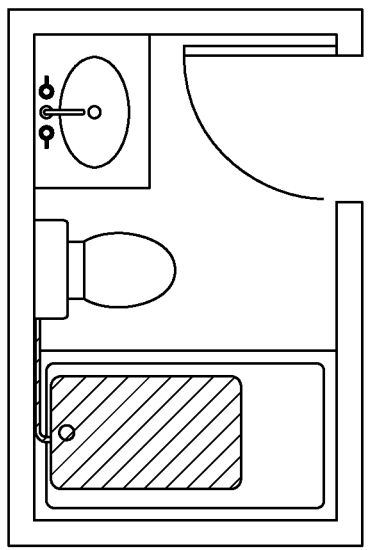
FIG. 26 is a top view of the bathroom system of FIG. 25.
Figure 27:
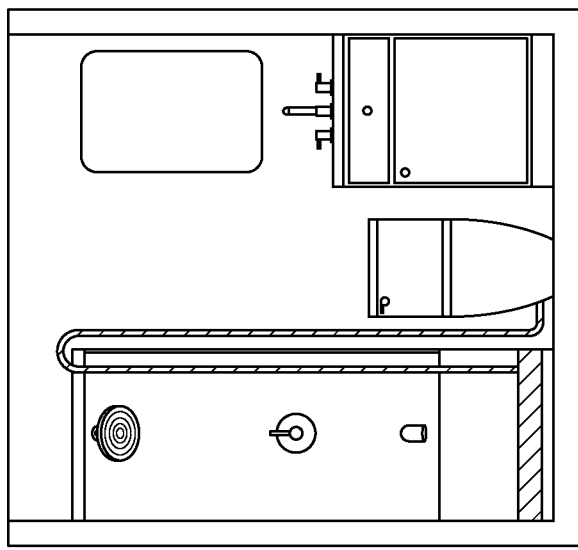
FIG. 27 is a front view of the bathroom system of FIG. 25.

Referring now to FIGS. 25-27, a bathroom system 900 is shown, according to an exemplary embodiment. The bathroom system 900 includes a shower system 905, a sink system 910, and a toilet 915 positioned between the shower system 905 and the sink system 910. In other embodiments, the sink system 910 is positioned between the shower system 905 and the toilet 915.

The bathroom system 900 includes a shower tray gray water tank 920 positioned within the shower system 905. The shower tray gray water tank 920 may be a tray positioned within the shower system 905 where the shower tray gray water tank 920 is provided along a portion of a shower receptor. In other embodiments, the shower tray gray water tank 920 is wholly provided along the shower receptor. The shower tray gray water tank 920 may further include a height (e.g., distance between a bottom of the shower tray gray water tank 920 and a top of the shower tray gray water tank 920) where the gray water may be stored before transferring to the toilet 915. A top of the shower tray gray water tank 920 may be a sloped portion extending substantially towards a drain ring of the shower tray gray water tank 920. As can be appreciated, when gray water is applied to the top of the shower tray gray water tank 920, the gray water is biased towards the drain ring such to capture most of the gray water within the shower system 905.

The shower tray gray water tank 920 includes a first pipe 925 or conduit fluidly coupled to the shower tray gray water tank 920 and the toilet 915. The first pipe 925 may be a water outlet, where gray water is delivered to the toilet 915 from the shower tray gray water tank 920. The first pipe 925 is configured to capture the gray water via the shower tray gray water tank 920 and deliver the gray water to the toilet 915. Additionally or alternatively, the first pipe 925 may be configured to capture fluid (e.g., clean water, etc.) via the shower tray gray water tank 920 and deliver the fluid to the toilet 915. The first pipe 925 may be an external pipe that is positioned along a sidewall of the bathroom system 900. As shown in FIG. 25, the first pipe 925 extends over top of a sidewall of the shower system 905. The first pipe 925 is coupled to the shower tray gray water tank 920 proximate a central portion of the shower tray gray water tank 920 and is further coupled to a bottom portion of a reservoir of the toilet 915 (e.g., sump, etc.).

The shower tray gray water tank 920 may be configured to filter the gray water from the shower system 905. The shower tray gray water tank 920 may be substantially similar to the gray water tank 120 described in the bathroom system 100 and the same description applied to the gray water tank 120 in the bathroom system 100 is applied here as if reiterated in full.

The shower tray gray water tank 920 may include an electrical connection configured to draw power from an external power supply (e.g., outlet plug, etc.). The electrical connection may be substantially similar to the electrical connection described in the bathroom system 100 and the same description applied to the electrical connection in the bathroom system 100 is applied here as if reiterated in full.

The shower tray gray water tank 920 may be configured hold the gray water delivered to the shower tray gray water tank 920 from the shower system 905. The shower tray gray water tank 920 may include one or more tanks contained within, that are configured to capture and hold the gray water. The one or more tanks may be airtight enclosures that do not allow the gray water or air to exit the one or more tanks.

Once the one or more tanks are full, no more gray water can be stored therein. The excess gray water is discharged into a drain in the shower system, where the gray water is traditionally disposed of.

When the toilet 915 is flushed, the gray water is supplied to the toilet 915 to assist in the performance of the flush (e.g., to provide all or a portion of the flush water, to provide replacement water to a toilet tank, to provide water to the sump to provide a pressure assist for the flushing action, etc.). The toilet 915 may be substantially similar to the toilet 115 described in the bathroom system 100 and the same description applied to the toilet 115 in the bathroom system 100 is applied here as if reiterated in full.

The gray water may be a secondary source of water for the flush. The toilet 915 further includes a primary water supply. The primary water supply may be a traditional water supply. The primary water supply may be substantially similar to the primary water supply described in the bathroom system 100 and the same description applied to the primary water supply in the bathroom system 100 is applied here as if reiterated in full.

Although it is contemplated to reuse gray water from the shower system 905, the gray water from the sink system 910 may further be transferred to the one or more tanks to assist in flushing the toilet 915. In such an embodiment, the sink system 910 may include an additional pipe that is configured to transfer the gray water from the sink system 910 to the shower tray gray water tank 920.

Hidden Gray Water Tank Bathroom Vanity

Referring now to FIGS. 28-30, a bathroom system 1000 is shown, according to an exemplary embodiment. The bathroom system 1000 includes a shower system 1005, a sink system 1010, and a toilet 1015 positioned between the shower system 1005 and the sink system 1010. In other embodiments, the sink system 1010 is positioned between the shower system 1005 and the toilet 1015. The bathroom system 1000 includes a gray water tank 1020. The gray water tank may be positioned within the sink system 1010 (although the gray water tank 1020 may be provided in any suitable location). The gray water tank 1020 may be one of a storage gray water tank, filtration gray water tank, etc. The gray water tank 1020 may be a prismatic gray water tank sized to tightly fit within the sink system 1010. In other embodiments, the gray water tank 1020 may take on a shape other than a prism.

The gray water tank 1020 includes a first pipe 1025 or conduit fluidly coupled to the shower system 1005 and the gray water tank 1020. The first pipe 1025 may be substantially similar to the first pipe 125 described in the bathroom system 100 and the same description applied to the first pipe 125 in the bathroom system 100 is applied here as if reiterated in full.

The gray water tank 1020 may be configured to filter the gray water delivered to the gray water tank 1020 from the first pipe 1025. The gray water tank 1020 may be substantially similar to the gray water tank 120 described in the bathroom system 100 and the same description applied to the gray water tank 120 in the bathroom system 100 is applied here as if reiterated in full.

The gray water tank 1020 may include an electrical connection configured to draw power from an external power supply (e.g., outlet plug, etc.). The electrical connection may be substantially similar to the electrical connection described in the bathroom system 100 and the same description applied to the electrical connection in the bathroom system 100 is applied here as if reiterated in full.

The gray water tank 1020 may be configured hold the gray water delivered to the gray water tank 1020 from the first pipe 1025. The gray water tank 1020 may include one or more tanks contained within, that are configured to capture and hold the gray water. The one or more tanks may be substantially similar to the one or more tanks described in the bathroom system 100 and the same description applied to the one or more tanks in the bathroom system 100 is applied here as if reiterated in full.

The gray water tank 1020 includes a second pipe 1035 fluidly coupled to the gray water tank 1020 and the toilet 1015. The second pipe 1035 may be a water outlet, where gray water is delivered to the toilet 1015 from the gray water tank 1020. The second pipe 1035 is configured to transfer gray water stored within the one or more tanks to the toilet 1015. That is, the second pipe 1035 may deliver gray water to a reservoir (e.g., sump, etc.) of the toilet 1015 so that the gray water may be used during a flush. The second pipe 1035 may be an external pipe that horizontally extends from a bottom portion of the gray water tank 1020 to the toilet 1015.

Once the one or more tanks are full, no more gray water can be stored therein.

When the toilet 1015 is flushed, the gray water is supplied to the toilet 1015 to assist in the performance of the flush (e.g., to provide all or a portion of the flush water, to provide replacement water to a toilet tank, to provide water to the sump to provide a pressure assist for the flushing action, etc.). The toilet 1015 may be substantially similar to the toilet 115 described in the bathroom system 100 and the same description applied to the toilet 115 in the bathroom system 100 is applied here as if reiterated in full.

The gray water may be a secondary source of water for the flush. The toilet 1015 further includes a primary water supply. The primary water supply may be a traditional water supply. The toilet 1015 may use the gray water in situations where the one or more tanks includes any amount of gray water for a flush. The remaining water for the flush comes from the primary water supply. For example, the toilet 1015 may use an existing amount gray water from the one or more tanks and the remaining amount of water is drawn from the primary water supply on each flush.

Although it is contemplated to reuse gray water from the shower system 1005, the gray water from the sink system 1010 may further be transferred to the one or more tanks to assist in flushing the toilet 1015. In such an embodiment, the sink system 1010 may include an additional pipe that is configured to transfer the gray water from the sink system 1010 to the gray water tank 1020.

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above.

What is claimed is:

1. A bathroom system, comprising:
   a shower system comprising:
      a drain ring configured to collect gray water from the shower system;
   a sink system;
   a gray water tank comprising:
      an internal filtration system configured to remove material from the gray water;
      wherein the gray water tank is configured to filter and store the gray water, wherein the gray water tank is configured to introduce a chemical into the gray water to clean the gray water, and wherein the gray water tank is configured to draw electrical power from a power supply to actuate the internal filtration system;
   a toilet;
   a first conduit coupled to the gray water tank proximate a bottom edge of the gray water tank, wherein the first conduit fluidly connects the shower system and the gray water tank, wherein the first conduit is configured to transfer the gray water from the drain ring to the gray water tank, and wherein the first conduit extends over the top of a sidewall of the shower system; and
   a second conduit configured to transfer the gray water from the gray water tank to the toilet to provide water for flushing.

2. The bathroom system of claim 1, wherein the gray water tank is a standalone gray water tank.

3. The bathroom system of claim 1, wherein the gray water tank is a hidden gray water tank.

4. The bathroom system of claim 1, wherein the gray water tank is a mountable gray water tank on a sidewall of the bathroom system.

5. The bathroom system of claim 1, wherein the gray water tank is a mountable gray water tank in a sidewall of the bathroom system.

6. The bathroom system of claim 1, wherein the first conduit is an external pipe that is positioned along a sidewall of the bathroom system and rearward the toilet.

7. The bathroom system of claim 1, wherein the gray water tank comprises accessory features positioned externally the gray water tank.

8. The bathroom system of claim 1, wherein the sink system comprises a third conduit that is configured to transfer gray water from the sink system to the gray water tank.

9. The bathroom system of claim 1, wherein the first conduit extends vertically upwards along the sidewall of the shower system along a first side of the sidewall, over the top of the sidewall, and vertically downwards along the sidewall along a second side of the sidewall opposite the first side.

10. A bathroom system, comprising:
   a shower system comprising:
      a shower tray configured to collect gray water from the shower system;
   a sink system;
   a gray water tank comprising:
      an internal filtration system configured to remove material from the gray water;
      wherein the gray water tank is configured to filter and store the gray water, wherein the gray water tank is configured to introduce a chemical into the gray water to clean the gray water, wherein the gray water tank is configured to draw electrical power from a power supply to actuate the internal filtration system, and wherein the gray water tank is positioned within the shower system such that the gray water collected by the shower tray is supplied to the gray water tank;
   a toilet; and
   a conduit configured to transfer the gray water from the gray water tank to the toilet to provide water for flushing.

11. The bathroom system of claim 10, wherein the conduit is an external pipe that is positioned along a sidewall of the bathroom system and extends over the top of a sidewall of the shower system.

12. The bathroom system of claim 10, wherein the conduit is a first conduit, and wherein the sink system comprises a second conduit that is configured to transfer gray water from the sink system to the gray water tank.

13. A gray water tank for use in a bathroom system, comprising:
   an internal filtration system configured to remove material from gray water; and
   a top defining an opening to collect gray water, the top including a sloped portion extending towards the opening to direct gray water towards the opening;
   wherein the gray water tank is configured to filter and store gray water from a shower system, wherein the gray water tank is configured to be positioned within the shower system, wherein the gray water tank is configured to introduce a chemical into the gray water to clean the gray water, and wherein the gray water tank is configured to draw electrical power from a power supply to actuate the internal filtration system.

14. The bathroom system of claim 10, wherein the gray water tank is positioned along a bottom of the shower system.

15. The bathroom system of claim 10, wherein a top of the gray water tank is the shower tray including a sloped portion to direct gray water into the gray water tank.

16. The bathroom system of claim 10, wherein the conduit is coupled to the gray water tank proximate a central portion of the gray water tank.

17. The bathroom system of claim 10, wherein the conduit is coupled to a bottom portion of a reservoir of the toilet.

* * * * *